(12) United States Patent
Wai et al.

(10) Patent No.: US 7,686,865 B2
(45) Date of Patent: Mar. 30, 2010

(54) METHOD AND SYSTEM FOR RECOVERING METAL FROM METAL-CONTAINING MATERIALS

(75) Inventors: Chien M. Wai, Moscow, ID (US); Sydney S. Koegler, Richland, WA (US)

(73) Assignees: Idaho Research Foundation, Inc., Moscow, ID (US); Areva NP, Inc., Richland, WA (US)

( * ) Notice: Subject to any disclaimer, the term of this patent is extended or adjusted under 35 U.S.C. 154(b) by 324 days.

(21) Appl. No.: 11/795,424

(22) PCT Filed: Jan. 12, 2006

(86) PCT No.: PCT/US2006/001351

§ 371 (c)(1),
(2), (4) Date: Jul. 17, 2007

(87) PCT Pub. No.: WO2007/084116

PCT Pub. Date: Jul. 26, 2007

(65) Prior Publication Data

US 2008/0134837 A1    Jun. 12, 2008

Related U.S. Application Data

(60) Provisional application No. 60/645,201, filed on Jan. 18, 2005.

(51) Int. Cl.
*C22B 60/02*    (2006.01)
*C22B 60/04*    (2006.01)
*C22B 3/26*    (2006.01)

(52) U.S. Cl. .............................. 75/396; 75/398; 75/711; 75/722

(58) Field of Classification Search ..................... None
See application file for complete search history.

(56) References Cited

U.S. PATENT DOCUMENTS 4,214,901 A * 7/1980 Michal et al. ............... 423/139

(Continued)

OTHER PUBLICATIONS

Pierce, "Stripping of Tributylphosphate (TBP) with Steam during Evaporation," downloaded from http://sti.srs.gov/fulltext/tr2000158/tr2000158.html, Oct. 18, 2004.

(Continued)

*Primary Examiner*—George Wyszomierski
(74) *Attorney, Agent, or Firm*—Klarquist Sparkman, LLP

(57) ABSTRACT

Embodiments of a method and a system for recovering a metal, such as uranium, from a metal-containing material are disclosed. The metal-containing material is exposed to an extractant containing a liquid or supercritical-fluid solvent and an acid-base complex including an oxidizing agent and a complexing agent. Batches of the metal-containing material are moved through a series of stations while the extractant is moved through the stations in the opposite direction. After the extraction step, the metal is separated from the solvent, the complexing agent and/or other metals by exposing the extract to a stripping agent in a countercurrent stripping column. The complexing agent and the solvent exit the column and are separated from each other by reducing the pressure. The recovered complexing agent is recharged with fresh oxidizing agent and recombined with fresh or recovered solvent to form a recovered extractant, which is distributed through the extraction stations.

75 Claims, 9 Drawing Sheets

U.S. PATENT DOCUMENTS

| | | | | |
|---|---|---|---|---|
| 5,292,456 | A | * | 3/1994 | Francis et al. .................. 588/18 |
| 5,332,531 | A | * | 7/1994 | Horwitz et al. ............... 588/20 |
| 5,605,563 | A | * | 2/1997 | Kidby et al. .................. 75/744 |
| 5,698,103 | A | * | 12/1997 | Kurek ........................ 210/634 |
| 6,132,491 | A | * | 10/2000 | Wai et al. ...................... 75/722 |
| 6,176,895 | B1 | | 1/2001 | Desimone et al. |
| 6,241,807 | B1 | | 6/2001 | Enick et al. |
| 7,128,840 | B2 | | 10/2006 | Wai et al. |

OTHER PUBLICATIONS

Rousselet Robatel, "Liquid-Liquid Extraction," downloaded from http://www.rousselet-robatel.com/products/lx.php, Oct. 19, 2004.

Shimada et al., "Concept of reprocessing system with Super-DIREX process," *Super Green 2002, 1st International Symposium on Supercritical Fluid Technology for Energy and Environment Applications*, Kyung Hee University, Suwon, Korea, pp. 202-205, Nov. 3-6, 2002.

International Search Report dated Mar. 13, 2008 from International Application No. PCT/US2006/001351.

* cited by examiner

METHOD AND SYSTEM FOR RECOVERING METAL FROM METAL-CONTAINING MATERIALS

CROSS REFERENCE TO RELATED APPLICATIONS

This is the U.S. National Stage of International Application No. PCT/US2006/001351, filed Jan. 12, 2006, which claims the benefit of the earlier filing date of U.S. Provisional Application No. 60/645,201, filed Jan. 18, 2005, both of which are incorporated herein by reference.

FIELD

This disclosure concerns a method and system for recovering metals, such as uranium, from metal-containing materials, particularly by extraction in a liquid or supercritical-fluid solvent.

BACKGROUND

A broad range of industrial processes require the separation and recovery of metal from metal-containing material. Of particular importance is the separation and recovery of uranium from uranium-containing material. Uranium-containing material is generated as a byproduct of numerous processes, mostly associated with the nuclear power industry. Two examples of waste materials that contain significant quantities of uranium are spent nuclear fuel and incinerator ash from facilities that make nuclear fuel. Due to its toxicity and potential value, recovery of uranium from these and other waste materials is desirable.

The PUREX (Plutonium and Uranium Recovery by Extraction) process currently is the most commonly used process for separating uranium from uranium-containing material. By this process, the uranium-containing material first is dissolved in nitric acid to form a uranyl nitrate solution. The uranium in this solution then is separated by an organic solvent, such as tributylphosphate (TBP) mixed with a diluent, such as dodecane. Subsequent liquid-liquid extractions further purify the uranium.

The primary drawbacks of the PUREX process are cost and waste generation. The PUREX process, for example, involves numerous liquid-liquid extractions, which increase the cost of the process and increase the amount of liquid waste. The nitric acid dissolution step generates gaseous oxides of nitrogen that must be scrubbed from the off gas. This scrubbing step generates additional dilute nitric acid liquid waste. In addition, residue left over after the nitric acid dissolution step often contains residual nitric acid and requires treatment before disposal.

The environmental and economic costs of the PUREX process vary depending on the concentration of uranium in the starting material. When nitric acid is used to dissolve materials with high concentrations of uranium, such as spent nuclear fuel rods, the resulting uranyl nitrate solution is relatively concentrated. In contrast, when nitric acid is used to dissolve materials with lower concentrations of uranium, such as incinerator ash, the resulting uranyl nitrate solution is less concentrated. More extensive liquid-liquid extraction is required to separate uranium from low-concentration uranyl nitrate solutions than is required to separate uranium from high-concentration uranyl nitrate solutions. Unfortunately, known processes to concentrate the uranyl nitrate solution before solvent extraction are not practical.

There is a need to recover uranium and other metals from metal-containing materials at a lower cost and with less waste generation. This need is especially strong for the recovery of uranium from starting materials with low-to-moderate concentrations of uranium. Incinerator ash is one example of such a material. Factories that use uranium typically incinerate all of their combustible waste after it has been contaminated by uranium. This combustible waste can include, for example, packaging, protective suits and filters. The ash left over after burning this waste can contain various concentrations of uranium depending on factors such as the level of contamination and the presence of non-combustible contaminants other than uranium. Incinerator ash from facilities that manufacture nuclear fuel typically contains from about 5% to about 30% uranium. Currently, there are vast stockpiles of uranium-containing incinerator ash waiting for treatment or disposal and more is produced every day. Alternatives to the PUREX process are desperately needed.

Extraction with carbon dioxide maintained in liquid or supercritical form by the application of high pressure has been suggested as a more environmentally benign and potentially less expensive approach to metal recovery. Relevant references on this type of extraction include Samsonov, M. D.; Wai, C. M.; Lee, S. C.; Kulyako, Y.; Smart, N. G. Dissolution of Uranium Dioxide in Supercritical Fluid Carbon Dioxide. *Chem. Commun.* 2001, 1868-69 ("Samsonov") as well as U.S. Pat. Nos. 5,356,538, 5,606,724, 5,730,874, 5,770,085, 5,792,357, 5,840,193, 5,965,025, 6,132,491, 6,187,911, and U.S. Published Patent App. No. 2003/0183043 ("the Wai patent documents"), which are incorporated herein by reference. Collectively, Samsonov and the Wai patent documents disclose several variations of extraction with a liquid or supercritical fluid solvent, including the dissolution of tetravalent uranium dioxide with an acid-base complex including tributylphosphate and nitric acid.

The inventors of the present disclosure recognized a need for methods and systems specially designed for the practical application of cleaner and more efficient extraction technology to the recovery of metals, such as uranium, from metal-containing materials.

SUMMARY

Described herein are a method and a system for recovering a metal from a metal-containing material. The method can include an extraction step, during which the metal-containing material is exposed to an extractant to form an extract. The extractant can include a liquid or supercritical-fluid solvent and an acid-base complex including an oxidizing agent and a complexing agent. Upon exposure to the extractant, the metal forms a metal-containing complex with the complexing agent. The metal-containing complex is soluble in the solvent. After the extraction step, the metal can be separated from the extract in a stripping step. In the stripping step, the extract, which includes the metal-containing complex, is exposed to a stripping agent while the solvent is still in liquid or supercritical form. The metal migrates from the phase including the complexing agent into the stripping agent. After the stripping step, the stripping agent becomes a strip product and the extract becomes a raffinate.

The overall method can be substantially continuous. Certain steps, however, can be batch or semi-batch processes. For example, the extraction step can be a multi-stage, semi-batch process. The metal-containing material can be exposed to the extractant in a countercurrent extraction process to form the extract and a residue. After being depleted of the metal, the metal-containing material becomes a residue. During the extraction step, batches of the metal-containing material can be moved between two or more stations in series, such as in baskets. The extractant can be moved through these stations in a direction opposite to the direction in which the batches of metal-containing material are moved. In this way, the metal-containing material is in contact with extractant having a lower concentration of the metal as the metal-containing material moves through the process and the concentration of metal in the metal-containing material decreases.

The stripping step during which the extract is exposed to the stripping agent can be a countercurrent process. For example, the extract can be introduced into a first end of a countercurrent stripping column, while the stripping agent is introduced into a second end of the countercurrent stripping column, opposite to the first end. The stripping agent can be collected near the first end as the strip product and the extract can be collected near the second end as the raffinate. To increase dispersion, the stripping agent can be sprayed into the extract, such as at the second end of the stripping column.

Some embodiments of the stripping step are configured to separate two or more metals from each other as well as from the remainder of the extract. These metals can have different oxidation numbers, which can cause the metals to disassociate from their respective metal-containing complexes at different times during the stripping step. In this way, a first strip product and a second strip product can be formed by fractionating the strip product. In some embodiments, the metals to be separated are gadolinium and uranium. These metals can be extracted, for example, from spent nuclear fuel.

The complexing agent and the solvent can be recycled in a recycling step. This can begin by separating the solvent from the complexing agent by decreasing the pressure and/or increasing the temperature of the raffinate. This causes the solvent to become a recovered gas. The complexing agent separates out as a recovered complexing agent. Thereafter, the recovered complexing agent can be mixed with the oxidizing agent to form a recovered acid-base complex. The recovered acid-base complex then can be mixed with the solvent using a static mixer to form a recovered extractant. After it has been formed, the recovered extractant can be introduced into the extraction step. The solvent mixed with the recovered complexing agent to form the recovered extractant can be fresh solvent or recovered solvent, which is formed by condensing the recovered gas.

As an alternative to separating the solvent from the complexing agent, in some embodiments, a recovered extractant is formed by recharging the raffinate with the oxidizing agent. In this way, the solvent can be substantially continuously maintained in liquid or supercritical fluid form. Recharging the raffinate can include introducing at least a portion of the raffinate into a first end of a countercurrent recharging column and introducing at least a portion of the oxidizing agent into a second end of the countercurrent recharging column. Within the recharging column, any complexing agent present can combine with the oxidizing agent to reform the acid-base pair. The raffinate then can be collected near the second end of the recharging column as the recovered extractant. Excess oxidizing agent can be collected near the first end of the recharging column. In some embodiments, the excess oxidizing agent is used as a stripping agent for separating the metal from the extract. This is especially useful if the stripping step includes two stages performed at different levels of acidity to separately remove more than one type of metal.

In some disclosed embodiments, the solvent is a gas at room temperature and atmospheric pressure. For example, the solvent can be carbon dioxide. The stripping agent can be an aqueous liquid, such as water. The oxidizing agent can be nitric acid. The complexing agent can be tributylphosphate. The disclosed method and system can be used with a variety of metals, including uranium, gadolinium and plutonium. The metal-containing material can be a waste product, such as incinerator ash. In some disclosed embodiments, the metal accounts for less than about 30% of the weight of the metal-containing material.

The disclosed system is well suited for performing the disclosed method. Some embodiments of the disclosed system include an extraction device and a countercurrent stripping device. The extraction device can include two or more stations and an extractant-distribution network configured to distribute the extractant from an extractant source to the two or more stations in series. Each station can include a container configured to hold a batch of solid metal-containing material and expose that metal-containing material to the extractant. The containers can be separable from the stations and interchangeable between the stations to facilitate movement of the batches of metal-containing material between the stations. The containers also can be elongated with an extractant inlet at one end and an extractant outlet at the opposite end. The extractant outlet can include a filter permeable to the extractant, but impermeable to the metal-containing material, such as a sintered metal filter. At least one of the stations can include an ultrasound emitting device for applying ultrasonic vibrations to the associated container during the extraction. The stations also can be configured for mechanical mixing. In some disclosed embodiments, the stations are configured to withstand internal pressures greater than about 20 atm, greater than about 50 atm or even internal pressures greater than about 200 atm.

The countercurrent stripping device can include a stripping column configured to expose an extract from the extraction device, including the liquid or supercritical fluid solvent, to a stripping agent. This column can have a first end with an extract inlet and a stripping product outlet and a second end with a stripping agent inlet and a raffinate outlet. The stripping agent inlet can be a sprayer. The stripping column can contain a surface area enhancing media, such as a metal, e.g. stainless steel, or plastic mesh, for increasing contact between the stripping agent and the extract. Like the stations, the stripping column can be configured to withstand internal pressures greater than about 20 atm, about 50 atm or about 200 atm. In some disclosed embodiments, the countercurrent stripping device includes at least two stripping columns. The extract is routed through a first stripping column and then a second stripping column in series. The first stripping column can be configured primarily to separate the oxidizing agent from the extract, while the second stripping column is configured primarily to separate the metal from the extract. Multiple stripping columns also can be used to facilitate the separation of different metals, such as uranium and gadolinium.

In addition to the extraction device and the countercurrent stripping device, some embodiments of the disclosed system include a recycling device for recycling the solvent and/or the complexing agent. The recycling device can include a separator configured to reduce the pressure and/or increase the temperature of the raffinate exiting the stripping device. The recycling device also can include an acid-base complex mixer for mixing the recovered complexing agent recovered from the raffinate with the oxidizing agent to form the recovered acid-base complex. In some disclosed embodiments, the recycling device includes a condenser for condensing the recovered gas recovered from the raffinate to form the recovered solvent in liquid or supercritical fluid form. The recovered acid-base complex can be mixed with the recovered solvent or fresh solvent with a mixer, such as a static mixer, to form a recovered extractant, which can be routed through the stations of the extraction device by an extractant-distribution network. In certain other embodiments, the recycling device includes a recharging column configured to expose the raffinate to the oxidizing agent to form a recovered extractant. These embodiments also can include a surge tank configured to hold the recovered extractant exiting the recharging column. The surge tank can have an inlet for receiving make-up liquid or supercritical-fluid solvent.

DETAILED DISCUSSION

Figure 1:
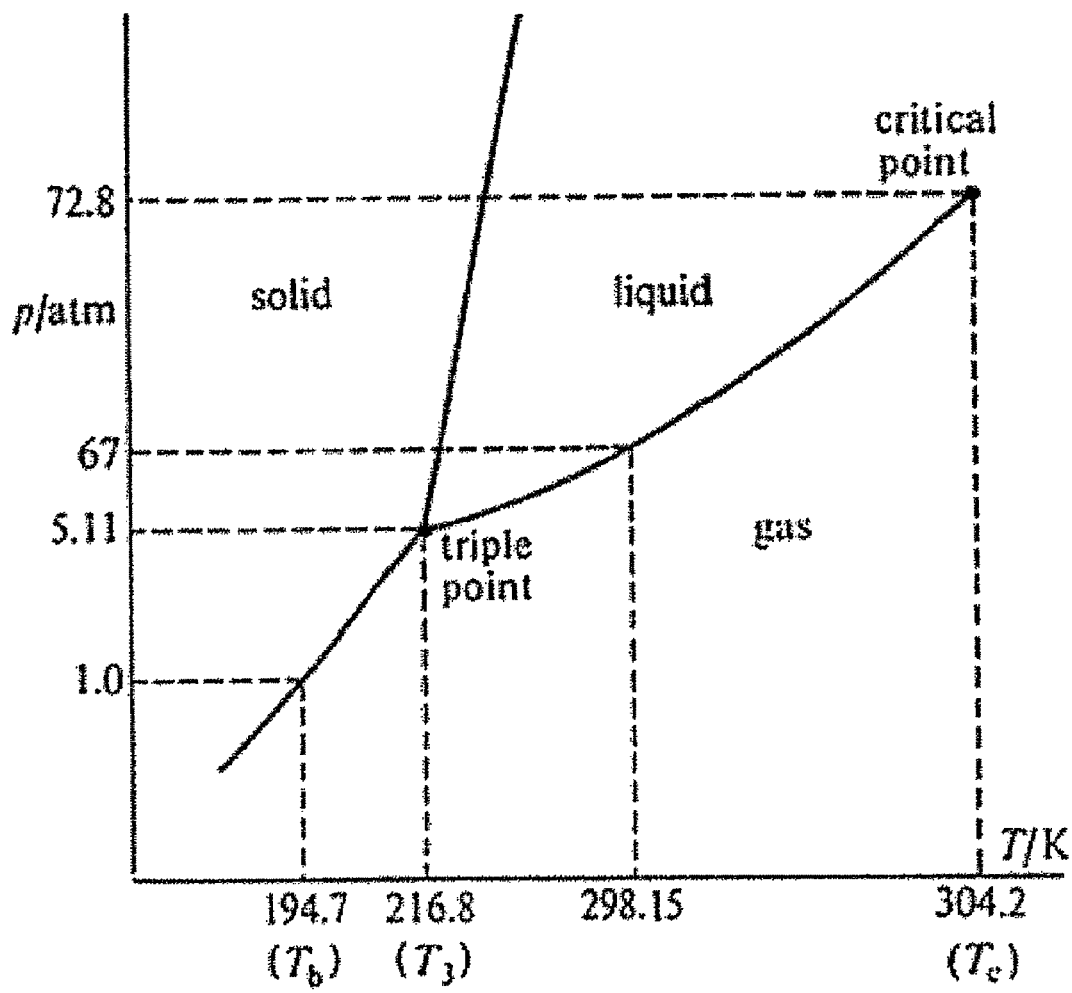
FIG. 1 is a phase diagram for carbon dioxide.

Throughout this disclosure, the singular terms "a," "an," and "the" include plural referents unless the context clearly indicates otherwise. Similarly, the word "or" is intended to include "and" unless the context clearly indicates otherwise. Reference to process fluids and other materials used in or generated by the disclosed method or system are intended to include all or any portion of antecedent quantities unless the context clearly indicates otherwise. For example, after the antecedent "a solvent," the term "the solvent" shall refer to all or any portion of the quantity of solvent contemplated by the antecedent unless the context clearly indicates otherwise.

The following terms may be abbreviated in this disclosure as follows: atmosphere (atm); critical pressure ($P_C$), critical temperature ($T_C$), cubic centimeter (cc), deionized water (DIW), ethylenediaminetetraacetic acid (EDTA), gram (g), fluoroacetylacetone (HFA), kilogram (kg), level control valve (LCV), liter (L), liters per hour (LPH), molar (M), nuclear magnetic resonance (NMR), pressure control valve (PCV), pump (P), safety valve (SV), tank (TK), thenoyltrifluoroacetone (TTA), tributylphosphate (TBP), and trioctylphosphineoxide (TOPO).

Disclosed herein are a method for recovering metal from metal-containing material and a system that can be used with the disclosed method. The disclosed method and system are based on the direct extraction of a metal with an extractant including a liquid or supercritical fluid solvent. Some embodiments of the disclosed method can be used to generate aqueous solutions with high-concentrations of the target metal, such as concentrations greater than about 5% by weight, greater than about 10% by weight or greater than about 12% by weight, from starting materials with relatively low concentrations of the target metal, such as concentrations less than about 30% by weight, less than about 20% by weight or less than about 15% by weight.

The disclosed method and system are particularly useful for the recovery of uranium from uranium-containing material. As discussed above, conventional approaches to uranium recovery have many disadvantages, including high cost and the generation of large amounts of hazardous waste. Direct extraction with an extractant including a liquid or supercritical-fluid solvent has potential as a cleaner and more efficient alternative to conventional uranium-recovery processes. For example, the disclosed extraction optionally can be performed without a separate nitric acid dissolution step. This reduces or eliminates the generation of gaseous oxides of nitrogen, reduces the amount of nitrate-containing liquid effluent, and reduces the amount and toxicity of the residual solid waste.

In the extraction of uranium, the disclosed method can be used to generate a high-concentration uranyl nitrate solution that is more efficient to process into a final product than the low-concentration uranyl nitrate solution commonly produced by nitric acid dissolution in the PUREX process. In fact, when the disclosed extraction is applied to a uranium-containing material that contains very few non-uranium contaminants, the uranyl nitrate solution produced by the extraction can, in some cases, be concentrated enough to be converted directly into a final product, such as $UO_2$, without the need for further treatment.

Method

Embodiments of a method for the separation and recovery of metal from a metal-containing material using a liquid or supercritical-fluid solvent are disclosed. The disclosed embodiments are particularly well-suited for recovering uranium from uranium-containing material. Some embodiments of the disclosed method include one or more of the following three steps: (1) extraction, (2) stripping, and (3) recycling. These steps are described in greater detail below.

Extraction

Some embodiments of the disclosed method begin with an extraction step. In this step, the metal-containing material is contacted with an extractant. The extractant can include, for example, a liquid or supercritical fluid solvent, an oxidizing agent and a complexing agent. Many of the solvents that are well suited for the extraction of metals are relatively non-polar. Most effective oxidizing agents, such as nitric acid, are not soluble in non-polar solvents. These oxidizing agents, however, can be made soluble by incorporation into an acid-base complex. For example, when nitric acid is bound to a compound such as TBP, the resulting acid-base complex is highly soluble in several non-polar solvents, including carbon dioxide. TBP therefore is capable of serving as a carrier for introducing nitric acid into the solvent.

Embodiments of the disclosed extraction can be performed with solvents in either liquid or supercritical fluid form. A compound exists as a supercritical fluid when it is at a temperature and pressure above a critical temperature and pressure characteristic of the compound. FIG. 1 is a phase diagram for carbon dioxide, which shows the conditions necessary to produce liquid carbon dioxide and supercritical carbon dioxide. Materials in a supercritical state exhibit properties of both a gas and a liquid. Supercritical fluids typically are able to act as solvents, like subcritical liquids, while also exhibiting the improved penetration power of gases. This makes supercritical fluids a preferred class of solvents for metal extraction. The disclosed liquid solvents can be gases at room temperature and atmospheric pressure. These solvents are converted into liquids by increasing the pressure and/or decreasing the temperature.

During the extraction of metals, such as uranium, with an acid-base complex including an oxidizing agent and a complexing agent, the oxidizing agent oxidizes the metal and the complexing agent binds to the metal, rendering it more soluble in the solvent than prior to complexation. After being oxidized, the metal can form stable complexes with the acid-base complex. For example, in the extraction of uranium with nitric acid as the oxidizing agent and TBP as the complexing agent, the uranium may form $UO_2(NO_3)_2.2TBP$. Uranium, gadolinium, plutonium, and many other lanthanides and actinides are capable of binding to large numbers of ligands. The disclosed process is especially well suited for the recovery of these metals. Most other metals do not share this property and are not capable of forming stable complexes with acid-base complexes such as $TBP-HNO_3$. These metals can be recovered by adding a separate chelating agent to the extractant.

One goal of the extraction step is to concentrate metal in the phase that includes the complexing agent. If the phase including the complexing agent has a high concentration of the metal to be recovered, the efficiency of the stripping step is improved. One way to increase the concentration of the metal to be recovered in the phase including the complexing agent is to decrease the amount of complexing agent in the extractant to which the metal-containing material is exposed. This method, however, can dramatically increase the required extraction time and therefore decrease the efficiency of the extraction process.

Similar or superior results can be achieved without compromising efficiency by using a countercurrent extraction process. The disclosed countercurrent extraction process is a departure from conventional, single-batch extraction processes. In a single-batch process, the concentration gradient between the metal-containing material and the phase including the complexing agent decreases over time. The disclosed countercurrent extraction process maintains the concentration gradient by moving the extractant and the metal-containing material during the extraction.

In some embodiments of the disclosed countercurrent extraction process, the extractant is moved through the extraction process in a first direction and the metal-containing material is moved though the extraction process in a second direction, opposite to the first direction. As the extractant moves in the first direction, the concentration of metal in the phase including the complexing agent increases. As the metal-containing material moves in the second direction, the concentration of metal in the metal-containing material decreases. Thus, the metal-containing material with the highest concentration of metal; i.e. the metal-containing material that has not yet been exposed to the extractant, first is exposed to extractant that has already been used to extract the metal from each of the other batches in the series. Only metal-containing material with a high metal concentration is capable of loading this used extractant with additional metal. Similarly, at the other end of the series, the metal-containing material with the lowest concentration of the metal is exposed to fresh extractant; otherwise, there would be an insufficient concentration gradient to drive the extraction. The countercurrent operation allows the disclosed process to maintain a concentration gradient between the metal-containing material and the phase including the complexing agent throughout the process.

Some embodiments of the disclosed countercurrent extraction process are multi-stage, semi-batch processes. Multi-stage, semi-batch processes can be useful, for example, where the metal-containing material is difficult to move continuously or where the extraction requires long periods of contact between the metal-containing material and the extractant. In some disclosed embodiments, batches of the metal-containing material are placed in separate extraction stations. The extractant is introduced into these stations in series, with the used extractant from one station feeding the next station in a first order. The extractant can be moved continuously or it can be held at each station for an extraction period before being released into the next station. As the metal is recovered from the metal-containing material, the batches of metal-containing material can be moved from one extraction station to the next extraction station in a second order opposite to the first order. When the batches of metal have reached the end of the series of stations, the metal-containing material is at least partially depleted of the metal and can be referred to as residue. The residue is less toxic than the metal-containing material prior to extraction and its disposal is less problematic.

Multi-stage, semi-batch embodiments of the disclosed extraction step can be used with any number of stations. In general, using a larger number of stations will result in a more complete separation. The completeness of the separation also can be dependent on the extraction time. In some embodiments, the batches of metal-containing material remain in each station for a set amount of time or for a time period effective to remove a certain amount of metal. In total, the metal-containing material can be, for example, exposed to the extractant for variable time periods, as would be understood by a person of ordinary skill in the art. Generally, the time period is between about 30 minutes and about 120 minutes, typically between about 40 minutes and about 100 minutes or more typically between about 50 minutes and about 80 minutes. The flow rate of the extractant through the extraction step can be, for example, between about 2 liters per hour and about 10 liters per hour, typically between about 3 liters per hour and about 8 liters per hour or more typically between about 4 liters per hour and about 7 liters per hour. The extraction step can be configured to recover varying amounts of the metal in the metal-containing material, such as between about 60% and about 100% of the metal, typically between about 80% and about 100% of the metal or more typically between about 85% and about 100% of the metal.

Stripping

Some embodiments of the disclosed method include a stripping step after the extraction step. After extracting the metal from the metal-containing material and completing the overall extraction step, the extractant can be referred to as an extract. The extract typically contains the solvent and complexes including the metal and the acid-base complex. The stripping step is intended to separate the metal from the extract. Stripping can be accomplished, for example, by exposing the extract to a stripping agent that has a higher affinity for metal than the extract. By way of theory, and without limiting disclosed embodiments to such theory, the oxidizing agent in the extract typically has a high affinity for the stripping agent and is the first component of the extract to be separated. As the concentration of the oxidizing agent decreases, the metal-containing complexes disassociate and the metal ions migrate into the stripping agent. In order to keep the stripping agent separate from the extract, it is helpful to select a stripping agent that is immiscible with, or at least separable from, the extract.

If two or more different metals are present in the extract, the stripping step also may be useful for separating these metals from each other. Metal ions with different charges, for example, form complexes with different numbers of acid-base complexes and, therefore, may separate from their associated acid-base complexes at different pH values. The pH of the extract can be determined primarily by the concentration of the oxidizing agent. Metals with higher charges require a larger number of anions to neutralize their charge and may disassociate from their respective metal-containing complexes at higher concentrations of the oxidizing agent.

Separating different metals in the extract from each other is particularly useful for processing spent nuclear fuel rods and other waste material that contains both uranium and gadolinium. Gadolinium-containing particles commonly are introduced into fuel rods as burnable poison to contain fission products. Both uranium and gadolinium form stable complexes with acid-base complexes, such as $TBP-HNO_3$, at high concentrations of the oxidizing agent and can thereby be solubilized in non-polar solvents, such as supercritical carbon dioxide. The uranium ion, however, typically has a plus two charge, while the gadolinium ion typically has a plus three charge. If the acid anion of the oxidizing agent has a plus one charge, uranium will associate with two acid-base complexes, while gadolinium will associate with three acid-base complexes. In the stripping step, as the oxidizing agent migrates into the stripping agent, the gadolinium-containing complexes will disassociate before the uranium-containing complexes. The uranium and gadolinium therefore can be separated by fractioning the strip product. In some embodiments, the gadolinium enters the stripping agent when the concentration of the oxidizing agent in the extract is between about 2 M and about 3 M and the uranium enters the stripping agent when the concentration of the oxidizing agent in the extract is between about 0.1 M and about 0.5 M.

Before and during the stripping step, the solvent can be in liquid or supercritical form. In some embodiments, the solvent is maintained in liquid form because the improved penetration power of a supercritical-fluid solvent is no longer necessary. To provide adequate volumes for the stripping step, the solvent can be separated from the extract and replaced with new solvent flowing in a continuous stream.

The stripping step can be a countercurrent process. While the extract is moving through the process in a first direction, the stripping agent is moving through the process in a second direction opposite to the first direction. The stripping agent often has a greater affinity for the oxidizing agent than for the metal. For example, the solubility of nitric acid in certain aqueous stripping agents, such as water, is greater than the solubility of uranyl ions in these stripping agents. In addition to maximizing the concentration gradient, the countercurrent design can allow both the oxidizing agent and the metal to be removed. In contrast, if both liquids move in the same direction, the stripping agent quickly would become loaded with the oxidizing agent and then would be incapable of removing a significant quantity of the metal.

Where the solubility difference between the oxidizing agent and the metal is particularly high, it may be useful to separate the stripping step into two or more stages. In a first stage, for example, the solute with the higher solubility in the stripping agent, such as the oxidizing agent, can be removed. Then, the extract can be routed into a second stage in which fresh stripping agent is used to remove the less soluble component, such as the metal. In this way, the presence of the more soluble component does not significantly inhibit the removal of the less soluble component. Multiple stages also may be useful for separating different metals that enter the stripping agent under different conditions and at different times during the stripping process, such as uranium and gadolinium.

The efficiency of the stripping process is affected by the amount of contact between the stripping agent and the extract. Because the stripping agent and the extract usually are immiscible, achieving this contact can be difficult. In some disclosed embodiments, the stripping agent is sprayed into the extract. The spraying action creates small droplets with a collective surface area far greater than the surface area of larger masses of liquid. The larger surface area of the droplets serves as a larger interface between the stripping agent and the extract, which improves the rate of mass transfer. In some disclosed embodiments, the extract flows through a high-surface-area stripping medium that helps to prevent the droplets from coalescing prematurely.

After gathering the metal, the stripping agent can exit the stripping step as a strip product. The solvent exits the stripping step with the complexing agent as a raffinate. In one embodiment where the metal is uranium, the stripping agent is water and the oxidizing agent is nitric acid, the strip product can be a concentrated uranyl nitrate solution. Direct dissolution of uranium-containing material with nitric acid, such as in the PUREX process, also can produce a uranyl nitrate solution, but the uranyl nitrate solution produced by the disclosed method typically is much more concentrated than that produced by the PUREX process. Thus, fewer additional steps, if any, are needed before the uranyl nitrate solution produced by the disclosed method can be converted into an end product, such as $UO_2$. In contrast, the uranyl nitrate solution produced by the PUREX process typically is dilute and requires additional steps, such as additional liquid-liquid extractions, to concentrate the uranium. This is particularly true when the PUREX process is applied to recover uranium from materials with a relatively low concentration of uranium, such as incinerator ash, and when the PUREX process is applied to recover uranium from materials containing an additional metal, such as gadolinium.

The flow rates of the extractant and the stripping agent can affect the amount of metal removed from the phase including the complexing agent. The flow rate of the extractant can be, for example, between about 10 liters per hour and about 100 liters per hour, between about 15 liters per hour and about 50 liters per hour or between about 20 liters per hour and about 30 liters per hour. The flow rate of the stripping agent can be, for example, between about 1 liter per hour and about 8 liters per hour, between about 1.5 liters per hour and about 5 liters per hour or between about 2 liters per hour and about 3 liters per hour. The total cycle time for the stripping step can be, for example, between about 30 minutes and about 120 minutes, between about 40 minutes and about 100 minutes or between about 50 minutes and about 80 minutes. The amount of metal removed from the extractant can be, for example, between about 50% and about 100%, between about 70% and about 100% or between about 90% and about 100%.

Recycling

Some embodiments of the disclosed method include a recycling step. Recycling limits the amount of hazardous waste produced by the process and has the potential to reduce the overall cost of the process. The recycling step can include recycling various materials used or formed during the process, such as the complexing agent, the solvent, or both. As mentioned above, in some disclosed embodiments, the complexing agent and the solvent exit the stripping step as a raffinate. This raffinate is different from the extractant in that at least a portion of the oxidizing agent has been consumed. Thus, the raffinate typically is not recycled directly into the extraction step without additional processing.

In some disclosed embodiments, the solvent is separated from the complexing agent by reducing the pressure and/or increasing the temperature of the raffinate. After the separation, the solvent from the raffinate becomes a recovered gas and the complexing agent from the raffinate becomes a recovered complexing agent. The recovered complexing agent can be combined with the oxidizing agent to form a recovered acid-base complex. The recovered gas can be condensed to form a recovered solvent in liquid or supercritical fluid form. The recovered acid-base complex can be combined either with the recovered solvent or with fresh solvent to form a recovered extractant. After it has been prepared, the recovered extractant can be reintroduced into the process at the extraction step, as described above.

In embodiments that include a recycling step, the efficiency of the stripping step affects the efficiency of the extraction step. Typically, the stripping step does not remove 100% of the metal from the phase including the complexing agent. The remaining metal is carried in the raffinate and then incorporated into the recovered complexing agent, the recovered acid-base complex and the recovered extractant. The presence of metal in the extractant decreases the efficiency of the extraction step. It is useful, therefore to separate as much metal as possible in the stripping step.

Another approach to the recycling step is to recharge the raffinate with oxidizing agent without separating the solvent. For example, the raffinate can be introduced into one end of a countercurrent column while the oxidizing agent is introduced into the opposite end. As the raffinate contacts the oxidizing agent within the column, any complexing agent present can combine with the oxidizing agent to reform the acid-base complex. The recharged raffinate then can be routed to the extraction step and used as a recovered extractant.

System

Figure 2:
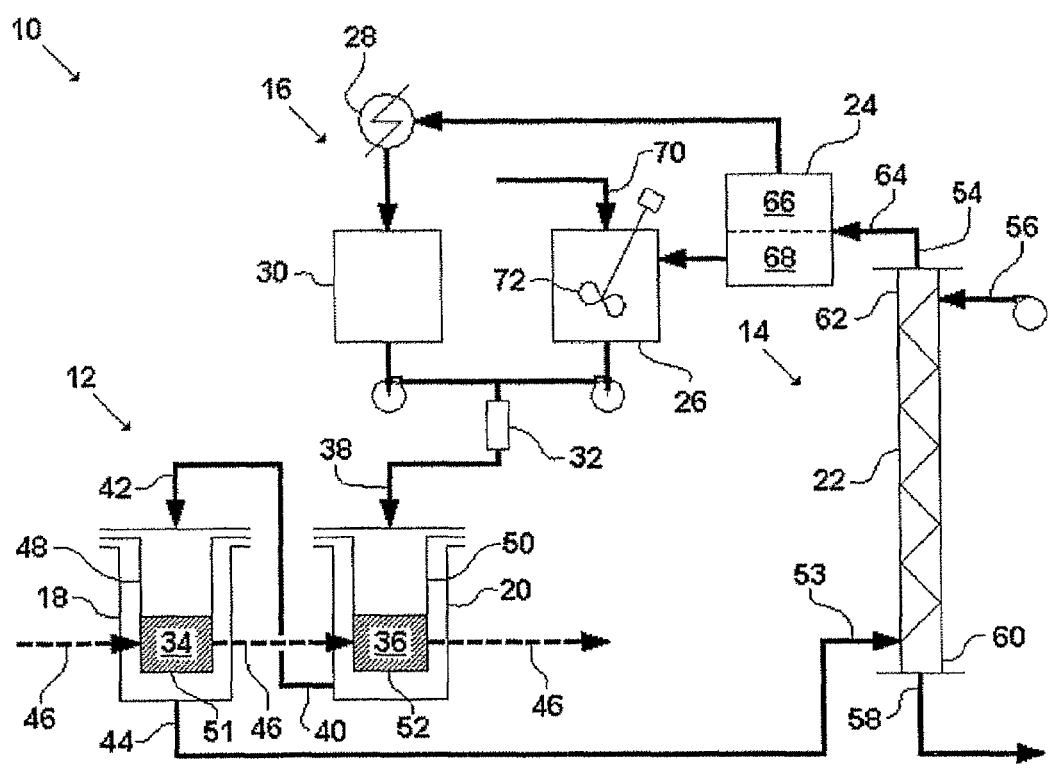
FIG. 2 is a schematic illustration of one embodiment of the disclosed system in which the stripping device includes one stripping column.

FIG. 2 illustrates one embodiment of the disclosed system for recovering a metal from a metal-containing material. The system 10 shown in FIG. 2 includes an extraction device 12, a stripping device 14 and a recycling device 16. The extraction device 12 includes a first station 18 and a second station 20. The stripping device 14 includes a stripping column 22. The recycling device 16 includes a separator 24, an acid-base complex mixer 26, a condenser 28, a solvent tank 30 and a static mixer 32.

In operation, the first station 18 contains a first batch of metal-containing material 34 and the second station 20 contains a second batch of metal-containing material 36. Extractant enters the second station 20 via a second station extractant inlet 38. After extracting metal from the second batch of metal-containing material 36, the extractant exits the second station 20 via a second station extractant outlet 40 and is routed into the first station 18 through the first station extractant inlet 42. After extracting metal from the first batch of metal-containing material 34, the extractant exits the first station 18 via a first station extractant outlet 44. During the extraction, the second batch of metal-containing material 36 is moved out of the second station 20 and then to further processing or disposal. The first batch of metal-containing material 34 is moved out of the first station 18 and into the second station 20. In general, extractant moves through the extraction step in a first direction and metal-containing material moves thorough the extraction step in a second direction opposite to the first direction and indicated by arrows 46.

Movement of the metal-containing material 34, 36 is facilitated by a first container 48 and a second container 50, located in the first and second stations 18, 20, respectively. The first and second containers 48, 50 are removable and interchangeable between the first and second stations 18, 20. The first and second containers 48, 50 also are configured to maximize contact between the extractant and the metal-containing material 34, 36. The first and second containers 48, 50 both are elongated. The extractant is routed directly into the first and second containers 48, 50 at their top ends and is forced to travel along the length of each container through the metal-containing material until it reaches a first and second filter 51, 52 positioned at the bottom of the first and second containers 48, 50, respectively. The first and second filters 51, 52 allow passage of the extractant, while blocking passage of the metal-containing material.

After the extractant leaves the extraction device 12 it can be referred to as an extract. The extract enters the stripping column 22 at an extract inlet 53. As the extract moves up the stripping column 22 toward a raffinate outlet 54, a stripping agent moves down the stripping column 22 from a stripping agent inlet 56 to a strip product outlet 58. The extract inlet 53 and the strip product outlet 58 are located near a first end 60 of the stripping column 22. The raffinate outlet 54 and the stripping agent inlet 56 are located near a second end 62 of the stripping column 22. The first end 60 of the stripping column 22 and the second end 62 of the stripping column 22 are the bottom and top ends, respectively.

The strip product exiting the stripping column 22 moves on for further processing. The raffinate moves into the recycling device 16. The raffinate first enters the separator 24 through a separator raffinate inlet 64. Within the separator 24, the pressure is reduced and the raffinate is separated into a recovered gas 66 and a recovered complexing agent 68. The recovered gas 66 exits the separator 24 and then flows into the condenser 28. The condenser 28 converts the recovered gas 66 into a recovered solvent that flows into the solvent tank 30. Meanwhile, the recovered complexing agent 68 flows out of the separator 24 and into the acid-base complex mixer 26. An oxidizing agent enters the acid-base complex mixer 26 through an acid-base complex mixer oxidizing agent inlet 70. A mixer 72 combines the oxidizing agent and the recovered complexing agent to form a recovered acid-base complex. The recovered acid-base complex exits the acid-base mixer 26 and is combined with the recovered solvent exiting the solvent tank 30 with the static mixer 32. After being mixed by the static mixer 32, the recovered solvent and the recovered complexing agent 68 form a recovered extractant, which flows into the extraction device 12 at the second station extractant inlet 38.

Figure 3:
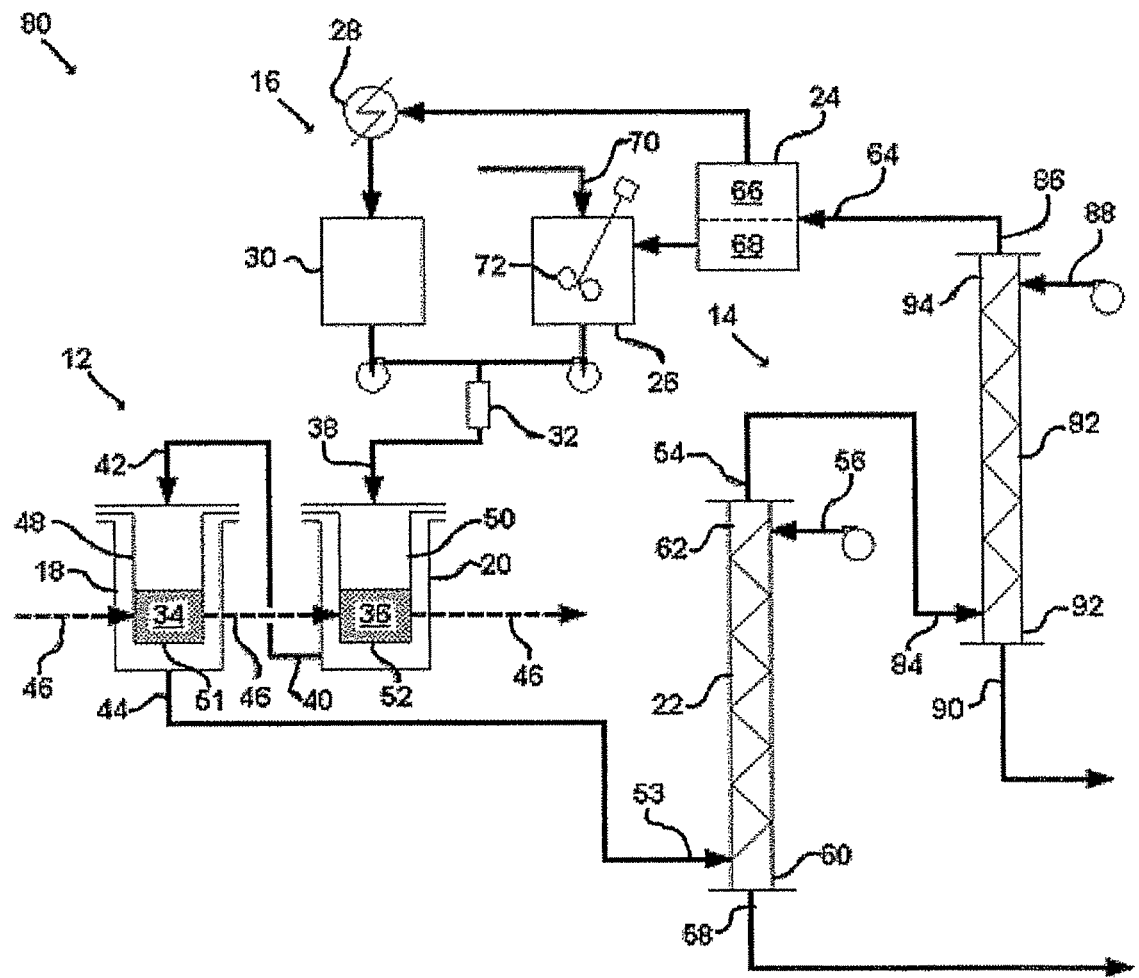
FIG. 3 is a schematic illustration of one embodiment of the disclosed system in which the stripping device includes two stripping columns.

FIG. 3 illustrates a system 80, which is another embodiment of the disclosed system for recovering a metal from a metal-containing material. The reference numerals from FIG. 2 are repeated in FIG. 3 to indicate similar or identical elements. The main difference between the system 80 in FIG. 3 and the system 10 in FIG. 2 is that the stripping device 14 in the system 80 in FIG. 3 includes first and second stripping columns 22, 82, whereas the stripping device 14 in the system 10 in FIG. 2 only includes one stripping column 22. In the system 80, the raffinate from the first stripping column 22 is exposed to fresh stripping agent in the second stripping column 82.

With regard to FIG. 3, after it leaves the first stripping column 22, the raffinate can be referred to as an intermediate raffinate. The intermediate raffinate is routed into the second stripping column 82 through an intermediate raffinate inlet 84. As the intermediate raffinate moves up the second stripping column 82 toward a final raffinate outlet 86, the stripping agent moves down the second stripping column 82 from a second stripping agent inlet 88 to a second strip product outlet 90. The intermediate raffinate inlet 84 and the second strip product outlet 90 are located near a first end 92 of the second stripping column 82. The final raffinate outlet 86 and the second stripping agent inlet 88 are located near a second end 94 of the second stripping column 82. The first end 92 of the second stripping column 82 and the second end 94 of the second stripping column 82 are the bottom and top ends, respectively. From the second stripping column 82, the final raffinate is routed into the separator 24 through the separator raffinate inlet 64. The strip product from the first stripping column 22 and the strip product from the second stripping column 82 typically are processed separately. Alternatively, the strip products can be combined for further processing.

Figure 4:
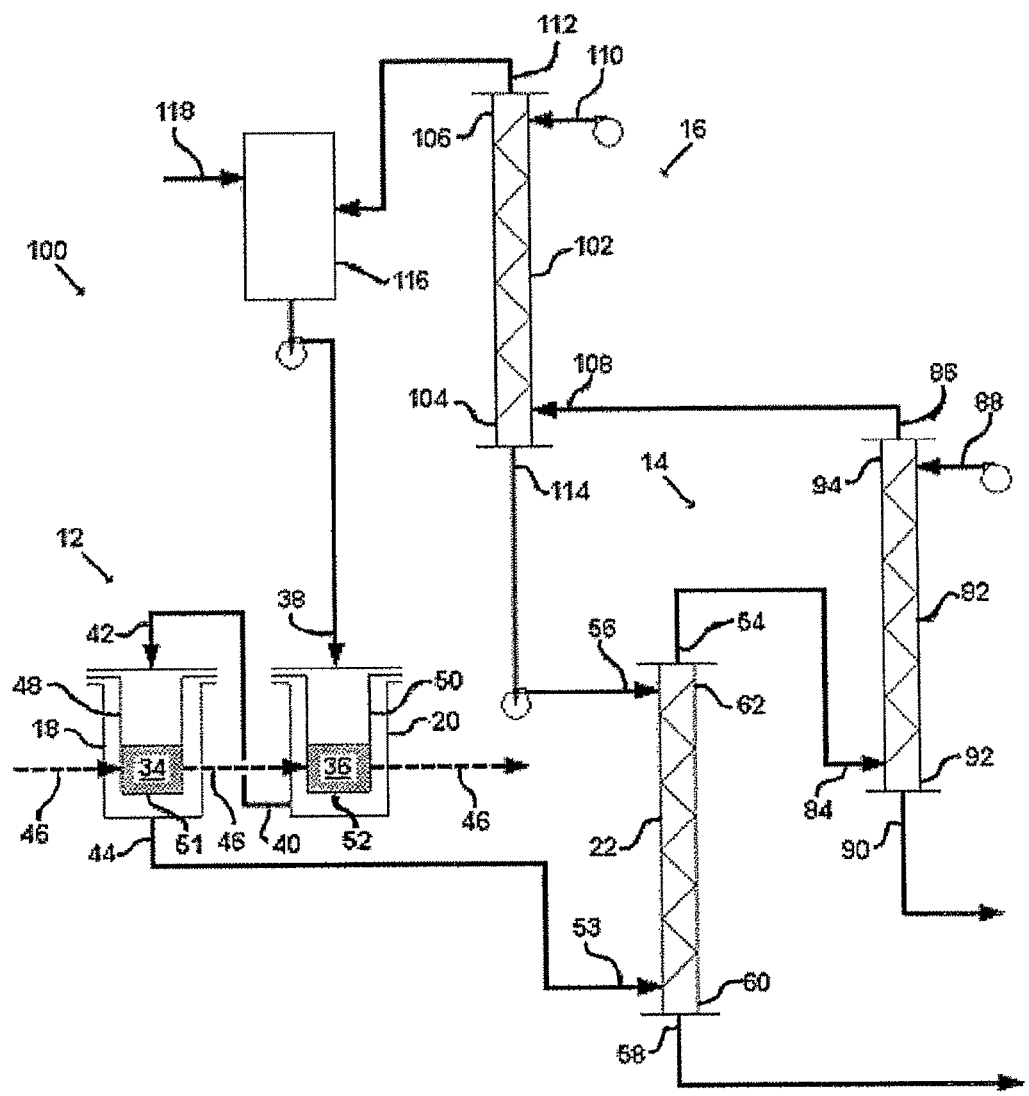
FIG. 4 is a schematic illustration of one embodiment of the disclosed system in which the recycling device includes a recharging column.

FIG. 4 illustrates yet another embodiment of the disclosed system. The reference numerals from FIGS. 2 and 3 are repeated in FIG. 4 to indicate similar or identical elements. The system 100 is similar to the system 80 illustrated in FIG. 3, except with respect to the recycling device 16. In the system 100, the recycling device 16 includes a recharging column 102 configured to receive the raffinate exiting the second stripping column 82. The recharging column 102 has a first end 104 and a second end 106. The raffinate enters the recharging column 102 at a recharging column raffinate inlet 108 located near the first end 104 of the recharging column 102. Oxidizing agent enters the recharging column 102 at a recharging column oxidizing agent inlet 110 located near the second end 106 of the recharging column 102. As the raffinate contacts the oxidizing agent within the recharging column 102, the complexing agent within the raffinate combines with the oxidizing agent to reform the acid-base complex. A recovered extractant including the solvent and the reformed acid-base complex then exits the recharging column 102 at a recovered extractant outlet 112 located near the second end 106 of the recharging column 102. Excess oxidizing agent exits the recharging column 102 at an excess oxidizing agent outlet 114 located near the first end 104 of the recharging column 102.

After exiting the recharging column 102, the excess oxidizing agent is routed to the stripping agent inlet 56 of the stripping column 22. The recovered extractant is routed into a surge tank 116. If necessary, make-up solvent and/or complexing agent can be added to the surge tank 116 through a make-up solvent/complexing agent inlet 118. From the surge tank 116, the recovered extractant flows into the second station 20 of the extraction device 12. A booster pump can be included near the surge tank 116 to provide the necessary motive force.

The embodiments illustrated in FIGS. 2-4 are merely exemplary. This disclosure also describes additional embodiments not limited to the particular features illustrated in FIGS. 2-4. As illustrated in FIGS. 2-4, embodiments of the system can include several devices that work together to perform the overall extraction. Three of these devices are discussed in the following subsections.

Extraction Device

As discussed above, a first step in the recovery of a metal from a metal-containing material can be an extraction step. In some embodiments of the disclosed method, extraction is performed by exposing the metal-containing material to an extractant including a liquid or supercritical fluid solvent. In addition to the solvent, the extractant can include an acid-base complex including an oxidizing agent and a complexing agent. Some embodiments of the disclosed system include an extraction device, such as extraction device 12, for carrying out the extraction step.

The extraction device can be designed for the extraction of metals, such as uranium, from solid materials, such as incinerator ash. Solid materials can be difficult to move through continuous processes, so most conventional extraction processes involving solid materials are batch processes. Batch processes also make it easier to expose the metal-containing material to the extractant for long periods of time. Batch processes, however, often are characterized by lower extraction efficiencies than continuous processes. This is because, as discussed above, batch processes are less effective at maintaining a concentration gradient between the extractant and the metal-containing material than countercurrent processes.

Many of the advantages of batch processing can be achieved without unduly sacrificing extraction efficiency by using a semi-batch process. Some embodiments of the disclosed extraction device include two or more extraction stations, each of which operates in a manner similar to a single batch extraction device. The extractant can be routed through these stations in series. Meanwhile, the batches of metal-containing material can be moved between the stations in an order countercurrent to the order in which extractant is moved. The countercurrent operation allows the disclosed process to maintain a concentration gradient between the metal-containing material and the extractant throughout the process.

Embodiments of the disclosed extraction device can include a network of piping routed through the stations in series. At one end of the series, an extractant inlet can be positioned to receive the extractant, e.g. from the recycling device. At the opposite end of the series an extractant outlet can be positioned to release the extractant, e.g. to the stripping device. Between the stations, pipes can be positioned to route used extractant from one station to the next station in series.

Each station can include a container for holding metal-containing material, such as solid metal-containing material. The containers, for example, can be cylindrical with solid walls and a bottom that is permeable to the extractant. The extractant can be introduced at the top of these containers so that it is forced to flow through the metal-containing material before it exits at the bottom of the container. The permeable portions of the container can be made of any useful material, such as sintered metal, which is permeable to liquids and gases, but not permeable to solids. After it flows through the container, the extractant can flow into the portion of the station external to the container before it is released through the station's extract outlet.

The stations in some embodiments of the disclosed extraction device are configured to allow the batches of metal-containing material to be transported between the stations. For example, the containers within the stations can be removable and interchangeable. In this way, the container in one station can be removed from that station with its batch of metal-containing material and then moved into the next station in the series. The batch of metal-containing material in the container at the end of the series can removed for disposal or further processing. The container at the end of the series then can be filled with raw metal-containing material and introduced into the first station in the series. Movement of the containers can be facilitated, for example, with handles designed to be gripped by a human or robotic operator.

Is some disclosed embodiments, the stations are configured to promote the extraction process by providing agitation. Agitation can be provided by any suitable means, including physical mixing and ultrasonic vibration. For example, one or more of the stations can be equipped with a magnetic stir bar or an ultrasound emitting device operable to apply ultrasonic vibrations to contents contained in the interior of the station.

The solvents well-suited for use in the disclosed process typically are gases at room temperature and atmospheric pressure. Maintaining these solvents in liquid form requires high pressures and/or low temperatures. Maintaining these solvents in supercritical fluid form requires high pressures and can require elevated temperatures depending on the critical temperature of the solvent. Some embodiments of the disclosed extraction device include stations that are configured to withstand high pressures, such as pressures greater than about 20 atm, about 50 atm or about 200 atm. For example, these stations can have rounded walls that are thick enough to withstand the high pressures. The extraction device also can include chillers and/or heaters to maintain the extractant at the proper temperature, such as above its critical temperature if the solvent is to be maintained in supercritical fluid form. The extraction device also can be insulated.

In some disclosed embodiments, the containers within the stations are designed to be moved after the stations have been evacuated. To allow this, the extractant inlets and outlets on each station can be fully closed to isolate each station from the extractant. The stations also can be isolated in this manner to allow the metal-containing material to soak in a volume of extractant for an extended period of time.

Stripping Device

In some embodiments of the disclosed method, the metal from the metal-containing material is made soluble in the solvent by oxidation and complexation with a complexing agent. The metal in the extract can be bound within complexes including the complexing agent and/or the oxidizing agent. Some embodiments of the disclosed system include a stripping device configured to separate the metal from one or more of the solvent, the complexing agent, the oxidizing agent and other metals. The stripping device, for example, can be configured to expose the extract exiting the extraction step to a stripping agent.

The stripping device can include a stripping column, such as a countercurrent stripping column. The extract can be introduced into the column at an extract inlet and then exit the column, after being depleted of metal, at a raffinate outlet. The extract inlet and the raffinate outlet typically are at opposite ends of the column. In a similar manner, the stripping agent can be introduced into the column at a stripping agent inlet and then exit the column, after gaining metal, at a strip product outlet. Like the extract inlet and the raffinate outlet, the stripping agent inlet and the strip product outlet typically are at opposite ends of the column. In embodiments in which the stripping column is configured for countercurrent operation, the extract inlet and the strip product outlet can be positioned near a first end of the column and the stripping agent inlet and the raffinate outlet can be positioned near a second end of the column opposite to the first end. Whether the first and second ends are the top and bottom ends, respectively, or the bottom and top ends, respectively, depends on the relative densities of the extract and the stripping agent. For example, if the stripping agent has a higher density than the extract, it will be pulled down by the force of gravity, so the first end, which includes the strip product outlet, can be the bottom end of the column and the second end, which includes the stripping agent inlet, can be the top end of the column.

Countercurrent operation is particularly useful if there is a difference in the affinity of the stripping agent for the oxidizing agent versus the metal. For example, in a countercurrent stripping column, if the stripping agent has a higher affinity for the oxidizing agent than for the metal, the oxidizing agent is removed from the extract near the point at which the extract enters the column. As the extract moves through the column it becomes depleted of the oxidizing agent and begins to contact the stripping agent closer to the point at which the stripping agent enters the column. Therefore, the extract contacts the freshest stripping agent after the oxidizing agent has been significantly depleted. The gradual depletion of the oxidizing agent also can facilitate the separate removal of different metals, such as uranium and gadolinium.

In some disclosed embodiments, the stripping device includes two or more stripping columns. This is especially useful if the stripping agent cannot easily be loaded with both the metal and the oxidizing agent. For example, in some applications, the presence of one solute in the stripping agent significantly affects the ability of the stripping agent to remove the other solute from the extract. In the first stripping column, the extract can be depleted of the component with a higher solubility in the stripping agent. An intermediate raffinate exiting the first stripping column then can be routed into the second stripping column where fresh stripping agent can be introduced to separate the component with a lower solubility in the stripping agent. The strip product from both stripping columns then can be combined.

Separate stripping columns also can be used to facilitate the separation of different metals within the extract, such as uranium and gadolinium. The metal that enters the stripping agent first can be removed in a first strip product from the first column and the metal that enters the stripping agent later can be removed in a second strip product from the second stripping column. Where the first and second strip products contain different metals, they typically are processed separately, rather than combined.

Embodiments of the disclosed stripping device typically are configured for liquid-liquid stripping processes. These processes rely on solubility differences between two immiscible liquids to drive the solute from one liquid into the other. The rate of mass transfer is improved by increasing the amount of contact between the two liquids. This can be done, for example, by vigorously mixing the liquids or by introducing one liquid into the column as droplets. The surface area of small droplets of liquid is far greater than the surface area of the same volume of liquid in a unified clump or stream. The liquid in droplet form can be referred to as the dispersed phase. Embodiments of the disclosed stripping device typically are configured to introduce the stripping agent as the dispersed phase.

One way to separate a liquid into small droplets is to pass the liquid through a sprayer. In some embodiments of the disclosed stripping device, the stripping agent is sprayed into the stripping column with a sprayer. The stripping column can have one sprayer or multiple sprayers distributed along the length of the column. Multiple sprayers allow fresh stripping agent to be introduced at different points throughout the column. In some disclosed embodiments, the stripping agent is sprayed into the extract as the extract flows through the column in an upward direction, such that droplets of stripping agent are suspended within the extract and move in a downward direction opposite to the direction of the extract by the force of gravity. The extract collects at the top end of the stripping column and exits at the top of the stripping column. Droplets of stripping agent coalesce into a pool at the bottom of the stripping column. The pools of extract and stripping agent at the ends of the stripping column tend to be relatively homogeneous because of the immiscibility of the liquids. The size of the stripping agent pool can be controlled by adjusting the flow rate of the stripping agent out of the stripping column and maintaining a constant interface between the two phases at the bottom of the column.

Droplets of a liquid floating in an immiscible liquid tend to gravitate towards each other over time. In some disclosed embodiments, this process is delayed by incorporating a high-surface area stripping medium into the stripping column. A high-surface area stripping medium can serve to attract the small droplets and thereby delay their conglomeration. One example of a high-surface-area stripping medium suitable for prolonging the separation of immiscible liquids is fiber mesh. The fiber mesh can be made from any suitable material, such as metal (e.g. stainless steel) or plastic. The mesh can terminate near the inlets for the extract and the stripping agent to allow the stripping agent to pool beyond the extract inlet and the extract to pool beyond the stripping agent inlet. Another way to prolong the separation of the liquids is to recollect the dispersed phase at several points along the length of the column and then spray it back into the column after each collection point. Alternately, the liquid in the stripping column can be pulsed to force coalesced dispersed phase droplets through intermediate perforated plates to reform small droplets of the dispersed phase.

It is beneficial for the extract to include the solvent in order to maintain a sufficient density difference between the phases to allow for proper column operation and phase separation. It can be important to prevent the solvent from evaporating significantly before or during the stripping step. It can be useful, therefore, to maintain the solvent in liquid or supercritical fluid form before and during the stripping step. Most of the solvents used with the disclosed method require high pressures and/or low temperatures to remain in liquid form. In order to maintain the solvents in supercritical form, high pressures and elevated temperatures typically are required. Like the extraction stations, embodiments of the stripping column can be configured to maintain the solvent at high pressures, such as pressures greater than about 20 atm, about 50 atm or about 200 atm. The stripping column can, for example, include reinforced, rounded walls.

In embodiments in which the stripping agent is sprayed into the column, the stripping agent inlet can be a high-pressure sprayer. The source of the stripping agent can be at a high enough pressure to spray the stripping agent into the column without significant backflow. For example, backflow desirably may be minimized or substantially eliminated, especially where the stripping agent is water and the stripping column is attached to a shared water supply. As a precaution, some disclosed embodiments are supplied with a stripping agent that is stored in a dedicated stripping agent supply tank. Embodiments of the stripping device also can be configured to maintain the extract at the proper temperature, such as with insulation and chillers or heaters.

Recycling Device

To minimize the amount of liquid waste and to save on the cost of materials, some embodiments of the disclosed method incorporate a recycling step. This step can be carried out by a recycling device. The recycling device can be configured to recycle the complexing agent, the solvent or both. With the disclosed recycling device, the disclosed system can be highly contained, with little need for make-up solvent or make-up complexing agent.

The complexing agent and the solvent typically are present in a single phase before the recycling step. In some disclosed embodiments, the solvent is separated from the complexing agent before they are recycled, so that the complexing agent can be recharged with the oxidizing agent to replace the oxidizing agent consumed in the extraction step. The result is the formation of a recycled acid-base complex. In other embodiments, the acid-base complex is reformed without separating the complexing agent from the solvent. In these embodiments, the solvent can remain in liquid or supercritical fluid form at all times, except, for example, when the process is shut down for maintenance.

In some disclosed embodiments, a raffinate, such as the raffinate exiting the stripping device, enters a separator. The separator separates the solvent from the complexing agent by decreasing the pressure and/or increasing the temperature of the raffinate. Solvents for use with the disclosed process can be selected to evaporate at higher pressures and/or lower temperatures than the pressures and temperatures at which the complexing agents evaporate. For example, most of the disclosed solvents are gases at room temperature and atmospheric pressure, while most of the disclosed complexing agents are liquids at room temperature and atmospheric pressure. For most of the disclosed combinations of solvents and complexing agents, decreasing the pressure is a simple and efficient way to effect a virtually complete separation.

Separators for use with disclosed embodiments of the recycling device can reduce the pressure of the raffinate, for example, with a let-down valve. The let-down valve can be positioned near an inlet to an expansion tank. In some disclosed embodiments, the solvent is vented to the atmosphere or vented to a pollution control device. In other disclosed embodiments, some or all of the solvent is recycled.

The liquid outlet of the separator can be routed into an acid-base complex mixer. Within the acid-base complex mixer, the recovered complexing agent can be mixed with fresh oxidizing agent entering from an oxidizing agent source. The acid-base complex mixer typically does not need to be at high pressure because the recovered complexing agent and the oxidizing agent typically are liquids at room temperature and atmospheric pressure. In some disclosed embodiments, the acid-base complex mixer includes a tank with a mechanical mixing device. Typically the complexing agent and the oxidizing agent are miscible and only a limited amount of mixing is required.

In embodiments in which the solvent is recycled, the solvent exiting the separator as a gas can be converted into a recovered liquid or supercritical-fluid solvent. This can be done, for example, by decreasing the temperature and/or increasing the pressure of the solvent. Less energy is used by this process if the solvent is maintained at a relatively high pressure and/or low temperature after being separated from the complexing agent. For example, the separator can be configured to decrease the pressure and/or increase the temperature of the raffinate only as much as is required to perform the separation. If the solvent exiting the separator in gas form is at a high enough pressure, it may be possible to convert the solvent back into liquid or supercritical fluid form solely by decreasing its temperature in a condenser.

After the recovered complexing agent has been combined with the oxidizing agent to form a recovered acid-base complex and the solvent has been converted back into liquid or supercritical fluid form, the recovered liquid or supercritical-fluid solvent can be combined with the recovered acid-base complex to form a recovered extractant. This combination step typically occurs at high pressure because the solvent must be maintained in liquid or supercritical fluid form. In some disclosed embodiments, the recovered liquid or supercritical-fluid solvent is mixed with the recovered acid-base complex in a static mixer. The static mixer can be any device capable of mixing the recovered liquid or supercritical-fluid solvent and the recovered acid-base complex with few or no moving parts. Some static mixers include pipes with fixed internal components, such as blades, that agitate the liquids as the liquids flow through the mixer. Static mixers are well suited for mixing fluids at high pressure. In contrast, non-static mixers, such as mixers with mixing blades that rotate, tend to be unreliable at high pressures.

Embodiments of the disclosed system configured to reform the acid-base pair without separating the complexing agent from the solvent can include a recharging column. The recharging column can be configured to mix the raffinate with fresh oxidizing agent so as to allow any complexing agent present to recombine with the oxidizing agent and thereby reform the acid-base pair. The solvent and the reformed acid-base pair can exit the recharging column as a recovered extractant. Excess oxidizing agent can be used as a stripping agent in one of the upstream stripping columns. For example, the excess oxidizing agent can be introduced into a first stripping column configured to separate a metal that disassociates with the acid-base complex at a lower pH than a second metal. A stripping agent with a higher pH then can be used in a second stripping column downstream from the first stripping column to separate the second metal.

After it is formed, either with or without separation of the complexing agent from the solvent, the recovered extractant can be routed directly into the extraction device, as discussed above. Make-up solvent and/or complexing agent also can be added, if necessary. In some embodiments of the disclosed system a valve between the recycling device and the extraction device allows for precise control of the flow rate of the recovered extractant entering the extraction device.

Materials

The disclosed method and system are highly versatile and capable of using a variety of different materials to serve a variety of functions. Some of the classes of materials that can be used with the disclosed method and system are discussed in greater detain below.

Metal and Metal-Containing Material

The disclosed method and system can be used to recover a variety of metals from a variety of metal-containing materials. Different metals can be targeted, for example, by changing the oxidizing agent, the complexing agent, the stripping agent, or any combination thereof. Among complexing agents, for example, TBP is well suited for the recovery of lanthanides and actinides, such as uranium, gadolinium and plutonium.

Many of the metals that can be recovered with embodiments of the disclosed method and system are metals that are capable of bonding to large numbers of ligands. Among these metals are lanthanides and actinides, such as uranium, gadolinium and plutonium. These metals typically form stable complexes with acid-base complexes, such as $TBP-HNO_3$. Some metals that are not capable of bonding to large numbers of ligands can be extracted by adding a separate chelating agent to the extractant. These metals can be oxidized by the acid-base complex and then complexed with the chelating agent to become soluble in non-polar solvents, such as liquid or supercritical carbon dioxide. The stripping step and the stripping device discussed above can be modified to separate the metals from metal-containing complexes that include the chelating agent.

Some of the metals that are not capable of binding to large numbers of ligands are noble metals, platinum group metals and coinage metals. Noble metals, in general, are metals that are resistant to oxidation. The noble metals are gold, silver, palladium, platinum, rhodium, rhodium, iridium, and osmium. The platinum group metals are platinum, palladium, iridium, rhodium, ruthenium and osmium. The coinage metals are copper, gold, nickel, silver and platinum.

Some embodiments of the disclosed method and system are especially well suited for the recovery of uranium, gadolinium and plutonium from materials that contain one or more of these metals. These metals can be separated from each other during the stripping step, as discussed above, or recovered together and then separated from each other by subsequent liquid-liquid extractions, such as liquid-liquid extractions based on the relative affinity of the metals for TBP.

The metal-containing material from which the metal is recovered can take many forms. In most cases, the material is solid, but it also can be liquid. Some examples of solid materials that contain uranium are incinerator ash, spent nuclear fuel, reactor parts from decommissioned nuclear power plants and noncombustible operational waste. The disclosed method and system can be applied to any of these materials, but some disclosed embodiments are specifically configured for recovering metals from incinerator ash. Incinerator ash is highly permeable and easily dividable into batches of approximately equal size.

The disclosed method and system can be used on materials containing various concentrations of metals to be recovered. Some disclosed embodiments are especially well-suited for recovering metals present at relatively low concentrations, such as metals present at concentrations less than about 30% by weight, less than about 20% by weight or less than about 10% by weight.

Liquid or Supercritical-Fluid Solvent

In embodiments of the disclosed method, the separation of metals occurs in a liquid or supercritical-fluid solvent. Supercritical-fluid solvents are especially useful because they have greater penetration power than liquid solvents. In some disclosed embodiments the solvent is a gas at room temperature and atmospheric pressure. These solvents are useful, in part, because they can be separated easily from the metal-containing complex by decreasing the pressure and/or increasing the temperature. These solvents also tend to be relatively inert and either non-toxic or less toxic than other solvents.

Suitable solvents include, but are not limited to, carbon dioxide, nitrogen, nitrous oxide, methane, ethylene, propane and propylene. Carbon dioxide is a preferred solvent for both subcritical and supercritical fluid extractions because of its moderate chemical constants and its inertness. Carbon dioxide has a critical temperature of 31° C. and a critical pressure of 73 atm. Supercritical carbon dioxide is non-explosive and thoroughly safe for extractions. Carbon dioxide also is a preferred solvent because it is abundantly available and relatively inexpensive.

As mentioned above, supercritical solvents have certain advantages relative to liquid solvents, but liquid solvents still are suitable for many embodiments of the disclosed method. At room temperature, carbon dioxide becomes a liquid above 5.1 atm. Depending on the pressure, liquid carbon dioxide has a density comparable to or slightly greater than the density of supercritical carbon dioxide. Thus, the solvation power of liquid carbon dioxide is comparable to or slightly greater than that of supercritical carbon dioxide. Liquid carbon dioxide is able to dissolve metal-containing complexes, but liquid carbon dioxide does not have the "gas-like" properties of supercritical carbon dioxide. Liquid carbon dioxide has a high viscosity, a low diffusivity, and consequently a poor penetration power compared to supercritical carbon dioxide. The extraction efficiency of liquid carbon dioxide may depend on the applied pressure. In addition, it may be possible to improve the extraction efficiency of liquid carbon dioxide by applying agitation, such as ultrasonic agitation.

The liquid and supercritical fluid solvents used in embodiments of the disclosed method may be used individually or in combination. Examples of suitable solvents, and their critical temperatures and pressures, are shown in Table 1.

TABLE 1

Physical Properties of Selected Solvents

| Molecular Fluid | Formula | $T_C$ (° C.) | $P_C$ (atm) |
|---|---|---|---|
| Carbon dioxide | $CO_2$ | 31.1 | 72.9 |
| Nitrous oxide | $N_2O$ | 36.5 | 71.7 |
| Ammonia | $NH_3$ | 132.5 | 112.5 |
| n-Pentane | $C_5H_{12}$ | 196.6 | 33.3 |
| n-Butane | $C_4H_{10}$ | 152.0 | 37.5 |
| n-Propane | $C_3H_6$ | 96.8 | 42.0 |
| Sulfur hexafluoride | $SF_6$ | 45.5 | 37.1 |
| Xenon | Xe | 16.6 | 58.4 |
| Dichlorodifluoromethane | $CCl_2F_2$ | 111.8 | 40.7 |
| Trifluoromethane | $CHF_3$ | 25.9 | 46.9 |
| Methanol | $CH_3OH$ | 240.5 | 78.9 |
| Ethanol | $C_2H_5OH$ | 243.4 | 63.0 |
| Isopropanol | $C_3H_7OH$ | 235.3 | 47.0 |
| Diethyl ether | $(C_2H_{25})_2O$ | 193.6 | 36.3 |
| Water | $H_2O$ | 374.1 | 218.3 |

In some embodiments of the disclosed method, a modifier can be added to the solvent to vary the characteristics thereof. For example, a modifier can be added to the solvent to enhance the solubility of a particular complexed metal. Some useful modifiers are low-to-medium boiling point alcohols and esters, such as lower alkyl alcohols and esters. As used herein, the term "lower alkyl" refers to compounds having ten or fewer carbon atoms, and includes both straight-chain and branched-chain compounds and all stereoisomers. Typical modifiers can be selected from the group consisting of methanol, ethanol, ethyl acetate, and combinations thereof. The modifiers are added to the solvent in an amount sufficient to vary the characteristics thereof. This can be an amount, for example, between about 0.1% and about 20% by weight. The modifiers contemplated for use with embodiments of the disclosed method most typically are not supercritical fluids at the disclosed operating conditions. Rather, the modifiers simply are dissolved in the solvents to improve their solvent properties.

Oxidizing Agent

In some disclosed embodiments, the metal is oxidized with an oxidizing agent during the extraction step. For example, uranium dioxide in the +4 oxidation state does not form stable complexes with most commonly known chelating agents. Thus, it can be useful to use an oxidizing agent to convert uranium dioxide to the +6 oxidation state, which does form stable complexes with a number of complexing agents, including complexing agents, such as TBP, that are soluble in supercritical carbon dioxide.

Suitable oxidizing agents include Lewis acids, Brønsted-Lowry acids, mineral acids, and combinations thereof. Many of the useful oxidizing agents are non-organic acids. Specific examples include, but are not limited to, nitric acid, sulfuric acid and hydrogen peroxide. The oxidizing agent also can be a non-acid oxidizing agent. In some disclosed embodiments, the oxidizing agent is a compound that, after oxidizing the metal, is converted into products that are easily separable from the metal being extracted. For example, in some disclosed embodiments, the oxidizing agent is selected to break down into volatile and/or soluble products after oxidizing the metal. The oxidizing agent also can be selected to break down into compounds that are gases at room temperature and atmospheric pressure and/or water after oxidizing the metal.

Complexing Agent

Without the presence of a complexing agent, many oxidizing agents, such as nitric acid, are insoluble in non-polar solvents, such as supercritical carbon dioxide. Complexing agents can be combined with the oxidizing agents to form acid-base complexes that are soluble in non-polar solvents. For example, the solubility of the oxidizing agent in supercritical carbon dioxide can be increased from less than about 0.1 moles per liter at 50° C. and 100 atm to greater than about 0.5 moles per liter at 50° C. and 100 atm by combining the oxidizing agent with a complexing agent to form an acid-base complex.

Suitable complexing agents to be paired with the oxidizing agents include Lewis bases, Brønsted-Lowry bases, and combinations thereof. Complexing agents that are well suited for use with the disclosed method include Lewis bases soluble in supercritical carbon dioxide, and combinations thereof. Examples include, but are not limited to, alkyl phosphates, including tri-alkyl phosphates, such as TBP, as well as alkylphosphine oxides, including tri-alkylphosphine oxides, such as TOPO. The complexing agent also can be a non-basic complexing agent that is nevertheless capable of forming a complex with an oxidizing agent.

Acid-Base Complex

As mentioned above, the oxidizing agent and complexing agent can be introduced into the solvent as an acid-base complex. An oxidizing agent, such as nitric acid, can be combined with a complexing agent, such as TBP, to form an acid-base complex that is soluble in non-polar solvents, such as supercritical carbon dioxide. The oxidizing agent typically is the acid component of the acid-base complex, while the complexing agent typically is the base component of the acid-base complex.

TBP-$HNO_3$ can be prepared, for example, by mixing TBP with a concentrated nitric acid solution. Nitric acid dissolves in the TBP phase forming a Lewis acid-base complex of the general formula TBP$(HNO_3)_x(H_2O)_y$, which is separable from the remaining aqueous phase. The x and y values depend on the relative amount of TBP and nitric acid used in the preparation. TBP-$HNO_3$ complexes of different x and y values have been characterized by conventional titration methods as well as by proton NMR spectroscopy. Higher x values correspond to increased oxidation strength. In some disclosed embodiments x is greater than or equal to about 0.7 and y is less than or equal to about 0.7.

Chelating Agent

For the extraction of certain metals it can be useful to incorporate a chelating agent into the extractant. The chelating agent can be selected to solubilize the metal in the solvent after the metal has been oxidized. The use of a chelating agent different than the acid-base complex can be useful for the recovery of metals that do not form stable complexes with the acid-base complex. Beneficial factors to consider in the selection of chelating agents include, but are not limited to, high stability constants of the metal-containing complex formed, fast complexation kinetics, good solubility in the solvent for both the chelating agent and the metal-containing complex formed, and sufficient specificity to allow selective extraction of a metal or a group of metal ions.

Without limitation, chelating agents for practicing embodiments of the disclosed method include β-diketones, phosphine oxides (such as trialkylphosphine oxides, triarylphosphine oxides, and alkylarylphosphine oxides), phosphinic acids, carboxylic acids, phosphates (such as trialkylphosphates, triarylphosphates, and alkylarylphosphates), crown ethers, dithiocarbamates, phosphine sulfides, phosphorothioic acids, thiophosphinic acids, halogenated analogs of these chelating agents, and mixtures of these chelating agents. Some of the useful chelating agents have lower alkyl functional groups. Alkyl-substituted chelating agents with chain lengths of about eight carbons, especially branched-chain alkyl groups, are characterized by high solubilities in supercritical carbon dioxide.

A partial list of examples of chelating agents useful for solubilizing metals in non-polar solvents is provided in Table 2.

TABLE 2

Chelating Agents

Oxygen Donating Chelating Agents cupferron
chloranilic acid and related reagents
β-diketones and related reagents
N-benzoyl-N-phenylhydroxylamine and related reagents
macrocyclic compounds Nitrogen Donating Chelating Agents α-dioximines
diaminobenzidine and related reagents
porphyrins and related reagents Oxygen and Nitrogen Donating Chelating Agents 8-hydroxyquinoline
nitrosonapthols and nitrosophenols
EDTA
diphenylcarbazide and diphenylcarbazone
azoazoxy BN
octanol-2
methyl isobutyl ketone and related reagents
tri-alkyl amines, such as $(C_nH_{2n+1})_3N$ (n = 8-10), and related reagents
tri-octyl amines, such as $[CH_3(CH_2)_6CH_2]_3N$, and related reagents Sulfur or Phosphorus Donating Chelating Agents sodium diethyldithiocarbamate and related reagents
dithizone and related reagents
bismuthiol II
thenoyltrifluoroacetone
thioxine
thiophosphinic acids
phosphine sulfides
phosphorothioic acids
tributyl phosphate and related reagents Stripping Agent The stripping agent can be any liquid that has a higher affinity for the metal than the phase including the complexing agent. Metal ions typically have a higher solubility in an aqueous phase than in an organic phase. Therefore, in some disclosed embodiments, the stripping agent is aqueous. Water can be an effective stripping agent for removing metals, such as uranium, from the phase including the complexing agent, such as TBP. Other polar molecules in liquid form, such as alcohols, also may be suitable stripping agents.

In selecting a stripping agent, it can be useful to consider the processing required to convert the metal within the stripping agent into a final product. In the recovery of uranium, for example, using water as the stripping agent can result in the formation of a uranyl solution, such as a uranyl nitrate solution. This solution then can be converted directly into $UO_2$.

Operating Conditions

The operating conditions for the extraction step typically depend on the properties of the solvent, such as the critical temperature and the critical pressure for the solvent. The extraction can be, for example, carried out at a temperature and pressure greater than the triple point for the solvent or greater than the critical point for the solvent. The appropriate temperature and pressure depend on whether the solvent is maintained as a liquid or as a supercritical fluid. In extractions in which the solvent is carbon dioxide and the solvent is maintained as a liquid, the temperature and pressure can be, for example, any temperature and pressure combination in the liquid region of the carbon dioxide phase diagram shown in FIG. 1. If the solvent is maintained as a supercritical fluid, the temperature and pressure can be, for example, any temperature and pressure greater than the temperature and pressure at the critical point of the carbon dioxide phase diagram shown in FIG. 1.

As with the extraction step, the operating conditions for the stripping step typically depend on the properties of the solvent. Any of the temperature and pressure combinations disclosed for the extraction step also can be applied to the stripping step. In some disclosed embodiments, the stripping step does not benefit significantly from the improved penetration power of supercritical fluids so the solvent is maintained in liquid form.

The operating conditions can affect the rates of certain reactions in the disclosed method, such as the rate at which the metal is oxidized, the rate at which the metal is complexed and the rate at which the metal is stripped from the metal-containing complex. In general, higher pressures make the solvent denser, which tends to increase the rate of reactions occurring within the solvent. Higher temperatures also tend to increase the rate of these reactions. Therefore, in order to increase reaction rates, some embodiments of the disclosed method are performed at temperatures and pressures higher than the temperatures and pressures required to maintain the solvent in the desired phase. Temperature and pressure are interrelated, so using increased temperatures, for example, may necessitate the use of increased pressures to maintain the solvent in the desired phase and at the desired density.

EXAMPLES

The following examples are provided to illustrate certain particular embodiments of the disclosure. Additional embodiments not limited to the particular features described are consistent with the following examples.

Example 1

This example describes several laboratory trials that were performed to study the effect of process conditions on the mass transfer of the metal in the stripping step. In these trials, the metal was uranium, the complexing agent was TBP, the oxidizing agent was nitric acid and the stripping agent was water. Tables 3-7 show the concentrations of uranium and nitric acid before stripping as well as the concentrations of uranium and nitric acid in the organic and aqueous phases after stripping. Each table shows the results of one or more trials performed at a given temperature, pressure and ratio of TBP to water. Two values for each of these variables were tested, with each table showing the data for trials performed at a different combination of values. Comparing the data between the tables indicates the effect of each variable on the mass transfer. Within each table, the individual trials represent different starting concentrations of uranium and nitric acid.

TABLE 3

Stripping Data at 50° C., 200 bar and TBP:water = 1:1.9

| BEFORE | | | AFTER | | | | | | |
|---|---|---|---|---|---|---|---|---|---|
| [U] (g/L) | [HNO$_3$]$_{ini}$ (mol/L) | % U$_{aq}$' | U$_{org}$ (g/L) | U$_{aq}$ (g/L) | U$_{org}$/Uaq | U$_{aq}$ (mol/L) | [HNO$_3$]$_{aq}$ (mol/L) | [HNO$_3$]$_{org}$ (mol/L) | [HNO$_3$]$_{aq}$/[HNO$_3$]$_{org}$ |
| 219.03 | 8.30 | 39.12 | 133.3 | 85.7  | 1.6  | 0.360 | 4.98 | 6.31 | 0.79 |
| 162.01 | 6.67 | 30.86 | 112.0 | 50.0  | 2.2  | 0.210 | 4.8  | 3.55 | 1.35 |
| 107.5  | 7.10 | 17.74 | 88.4  | 19.1  | 4.6  | 0.080 | 5.4  | 3.23 | 1.67 |
| 58.71  | 7.37 | 4.61  | 56.0  | 2.7   | 20.7 | 0.011 | 5.9  | 2.79 | 2.11 |
| 173.71 | 4.76 | 30.95 | 119.9 | 53.8  | 2.2  | 0.226 | 3.68 | 2.05 | 1.79 |
| 109.67 | 4.70 | 27.91 | 79.1  | 30.6  | 2.6  | 0.129 | 3.3  | 2.66 | 1.24 |
| 34.12  | 4.26 | 23.3  | 26.2  | 7.9   | 3.3  | 0.033 | 2.44 | 3.46 | 0.71 |
| 182.41 | 3.30 | 46.61 | 97.4  | 85.0  | 1.1  | 0.357 | 2.35 | 1.81 | 1.30 |
| 129.69 | 3.30 | 40.46 | 77.2  | 52.5  | 1.5  | 0.220 | 2.26 | 1.98 | 1.14 |
| 91.45  | 3.30 | 31.13 | 63.0  | 28.5  | 2.2  | 0.120 | 2.09 | 2.30 | 0.91 |
| 187.26 | 2.74 | 35.38 | 121.0 | 66.3  | 1.8  | 0.278 | 1.86 | 1.67 | 1.11 |
| 65.14  | 2.82 | 31.72 | 44.5  | 20.7  | 2.2  | 0.087 | 1.88 | 1.79 | 1.05 |
| 204.86 | 1.87 | 56.27 | 89.6  | 115.3 | 0.8  | 0.484 | 1.3  | 1.08 | 1.20 |
| 146.92 | 1.52 | 53.34 | 68.6  | 78.4  | 0.9  | 0.329 | 0.96 | 1.06 | 0.90 |
| 111.91 | 1.87 | 48.58 | 57.5  | 54.4  | 1.1  | 0.228 | 1.25 | 1.18 | 1.06 |
| 105.64 | 1.70 | 56.53 | 45.9  | 59.7  | 0.8  | 0.251 | 1.39 | 0.59 | 2.36 |
| 75.11  | 1.83 | 53.97 | 34.6  | 40.5  | 0.9  | 0.170 | 1.25 | 1.10 | 1.13 |
| 204.73 | 1.21 | 61.51 | 78.8  | 125.9 | 0.6  | 0.529 | 0.96 | 0.48 | 2.02 |
| 204.73 | 1.21 | 60.5  | 80.9  | 123.9 | 0.7  | 0.520 | 0.99 | 0.42 | 2.37 |
| 103.1  | 0.70 | 90.83 | 9.5   | 93.6  | 0.1  | 0.393 | 0.64 | 0.11 | 5.61 |

TABLE 4

Stripping Data at 24° C., 200 bar and TBP:water = 1:1.9

| BEFORE | | | AFTER | | | | | | | Lost of |
|---|---|---|---|---|---|---|---|---|---|---|
| [U] (g/L) | [HNO$_3$]$_{ini}$ (mol/L) | % U$_{aq}$ | U$_{org}$ (g/L) | U$_{aq}$ (g/L) | U$_{org}$/Uaq | U$_{aq}$ (mol/L) | [HNO$_3$]$_{aq}$ (mol/L) | [HNO$_3$]$_{org}$ (mol/L) | [HNO$_3$]$_{aq}$/[HNO$_3$]$_{org}$ | Efficiency (%) |
| 204.73 | 1.21 | 61.1  | 79.6  | 125.9 | 0.6 | 0.526 | 0.957 | 0.48 | 1.99 | 0.67 |
| 173.71 | 4.76 | 28.39 | 124.4 | 49.3  | 2.5 | 0.207 | 3     | 3.34 | 0.90 | 8.27 |
| 162.01 | 6.67 | 20.87 | 128.2 | 33.8  | 3.8 | 0.142 | 4.305 | 4.49 | 0.96 | 32.37 |
| 111.91 | 1.87 | 51.25 | 54.6  | 57.4  | 1.0 | 0.241 | 1.478 | 0.74 | 1.98 | −5.50 |

TABLE 5

Stripping Data at 50° C., 200 bar and TBP:water = 1:1

| BEFORE | | | AFTER | | | | | | | Lost of |
|---|---|---|---|---|---|---|---|---|---|---|
| [U] (g/L) | [HNO$_3$]$_{ini}$ (mol/L) | % U$_{aq}$ | U$_{org}$ (g/L) | U$_{aq}$ (g/L) | U$_{org}$/Uaq | U$_{aq}$ (mol/L) | [HNO$_3$]$_{aq}$ (mol/L) | [HNO$_3$]$_{org}$ (mol/L) | [HNO$_3$]$_{aq}$/[HNO$_3$]$_{org}$ | Efficiency (%) |
| 204.73 | 1.21 | 48.95 | 104.5 | 100.2 | 1.0 | 0.421 | 0.739 | 0.89 | 0.83 | 20.42 |
| 173.71 | 4.76 | 14.46 | 148.6 | 25.1  | 5.9 | 0.106 | 2.392 | 4.50 | 0.53 | 53.28 |
| 162.01 | 6.67 | 9.77  | 146.2 | 15.8  | 9.2 | 0.067 | 3.609 | 5.82 | 0.62 | 68.34 |
| 111.91 | 1.87 | 31.2  | 77.0  | 34.9  | 2.2 | 0.147 | 1.044 | 1.57 | 0.67 | 35.78 |

TABLE 6

Stripping Data at 24° C., 200 bar and TBP:water = 1:1

| BEFORE | | | AFTER | | | | | | | Lost of |
|---|---|---|---|---|---|---|---|---|---|---|
| [U] (g/L) | [HNO$_3$]$_{ini}$ (mol/L) | % U$_{aq}$ | U$_{org}$ (g/L) | U$_{aq}$ (g/L) | U$_{org}$/Uaq | U$_{aq}$ (mol/L) | [HNO$_3$]$_{aq}$ (mol/L) | [HNO$_3$]$_{org}$ (mol/L) | [HNO$_3$]$_{aq}$/[HNO$_3$]$_{org}$ | Efficiency (%) |
| 109.67 | 4.70 | 18.26 | 89.6 | 20.0 | 4.5 | 0.084 | 2.87 | 3.48 | 0.83 | 34.58 |

TABLE 7

Stripping Data at 24° C., 80 bar and TBP:water = 1:1.9

| BEFORE | | | AFTER | | | | | | | Lost of |
|---|---|---|---|---|---|---|---|---|---|---|
| [U] (g/L) | [HNO$_3$]$_{ini}$ (mol/L) | % U$_{aq}$ | U$_{org}$ (g/L) | U$_{aq}$ (g/L) | U$_{org}$/ Uaq | U$_{aq}$ (mol/L) | [HNO$_3$]$_{aq}$ (mol/L) | [HNO$_3$]$_{org}$ (mol/L) | [HNO$_3$]$_{aq}$/ [HNO$_3$]$_{org}$ | Efficiency (%) |
| 204.73 | 1.21 | 62.1 | 77.6 | 127.1 | 0.6 | 0.534 | 1.044 | 0.32 | 3.31 | −0.96 |
| 162.01 | 6.67 | 8.81 | 147.7 | 14.3 | 10.4 | 0.060 | 2.957 | 7.05 | 0.42 | 71.45 |
| 173.71 | 4.76 | 32.93 | 116.5 | 57.2 | 2.0 | 0.240 | 3.305 | 2.76 | 1.20 | −6.40 |

The data in Tables 3-7 show that a greater percentage of uranium is stripped when the initial concentration of uranium is higher (e.g., greater than about 100 g/L, about 150 g/L or about 200 g/L) and when the initial concentration of nitric acid is lower (e.g., less than about 5 mol/L, about 3 mol/L or about 1 mol/L). The efficiency of the extraction step prior to the stripping step, however, typically is improved by a higher concentration of nitric acid in the extractant. Therefore, it may be necessary to balance the positive effect of nitric acid on the extraction step with the negative effect of nitric acid on the stripping step.

Example 2

Figure 5:
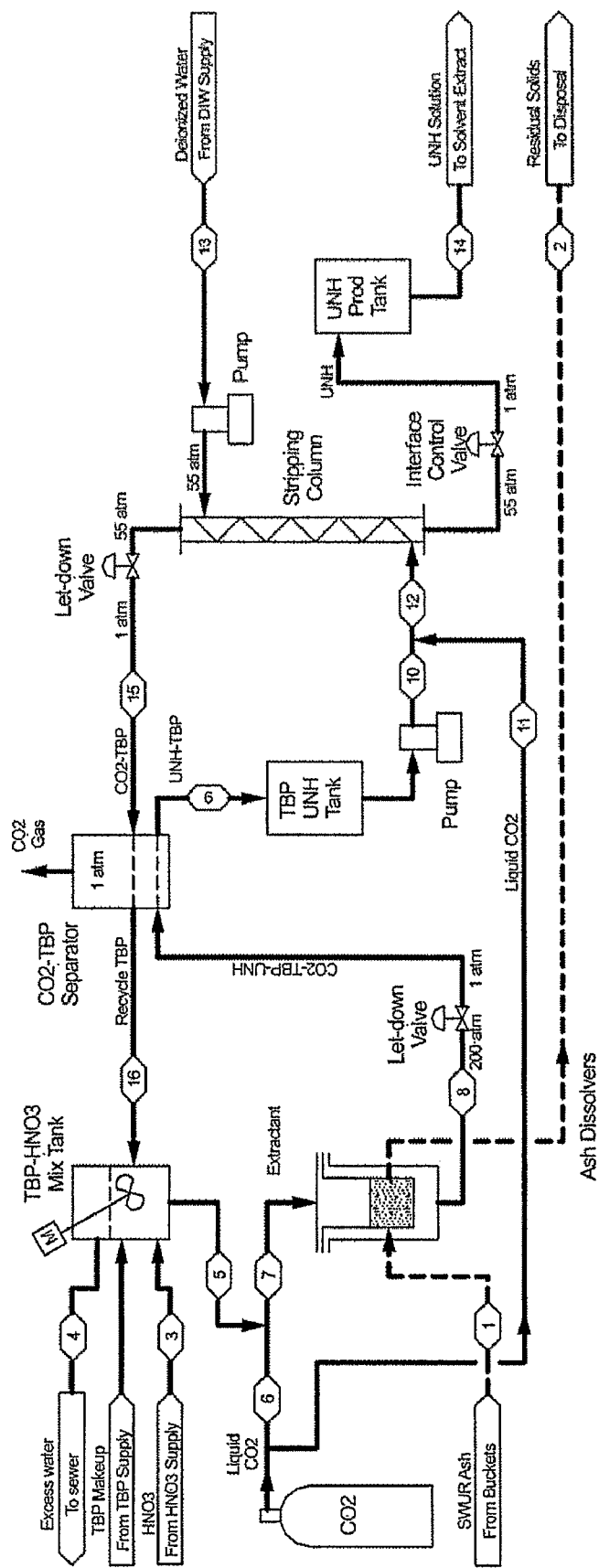
FIG. 5 is a simplified schematic illustration of one embodiment of the disclosed system, which was modeled to optimize process parameters, as described in Example 1.
Figure 6A:
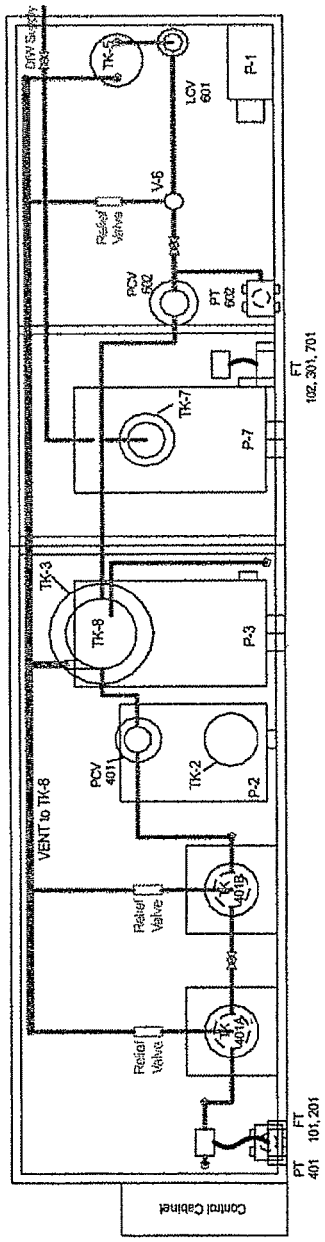
FIG. 6A is a plan view of the embodiment illustrated in FIG. 5, including piping.
Figure 6B:
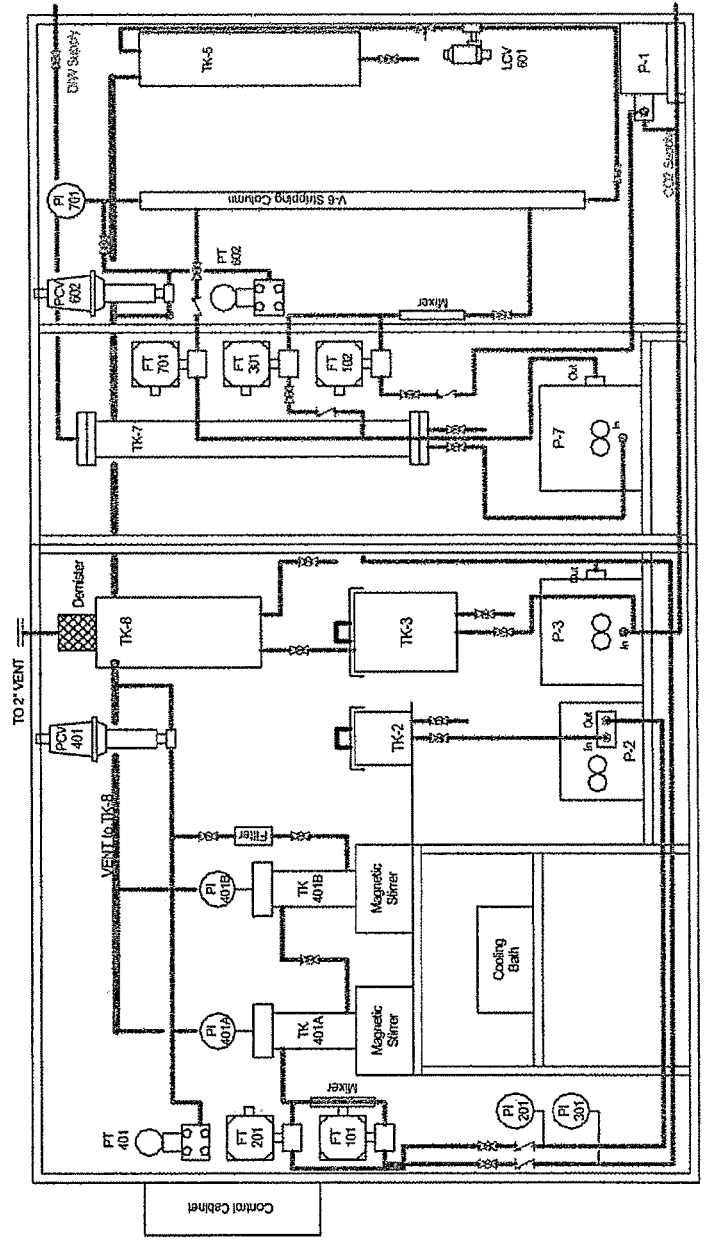
FIG. 6B is a schematic illustration of the embodiment illustrated in FIG. 5, including piping.
Figure 7A:
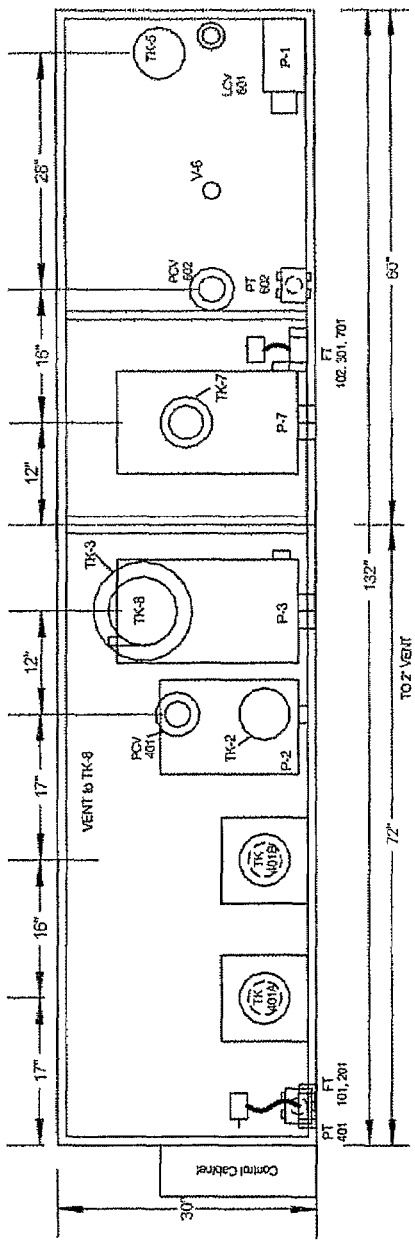
FIG. 7A is a plan view of the embodiment illustrated in FIG. 5, including dimensions.
Figure 7B:
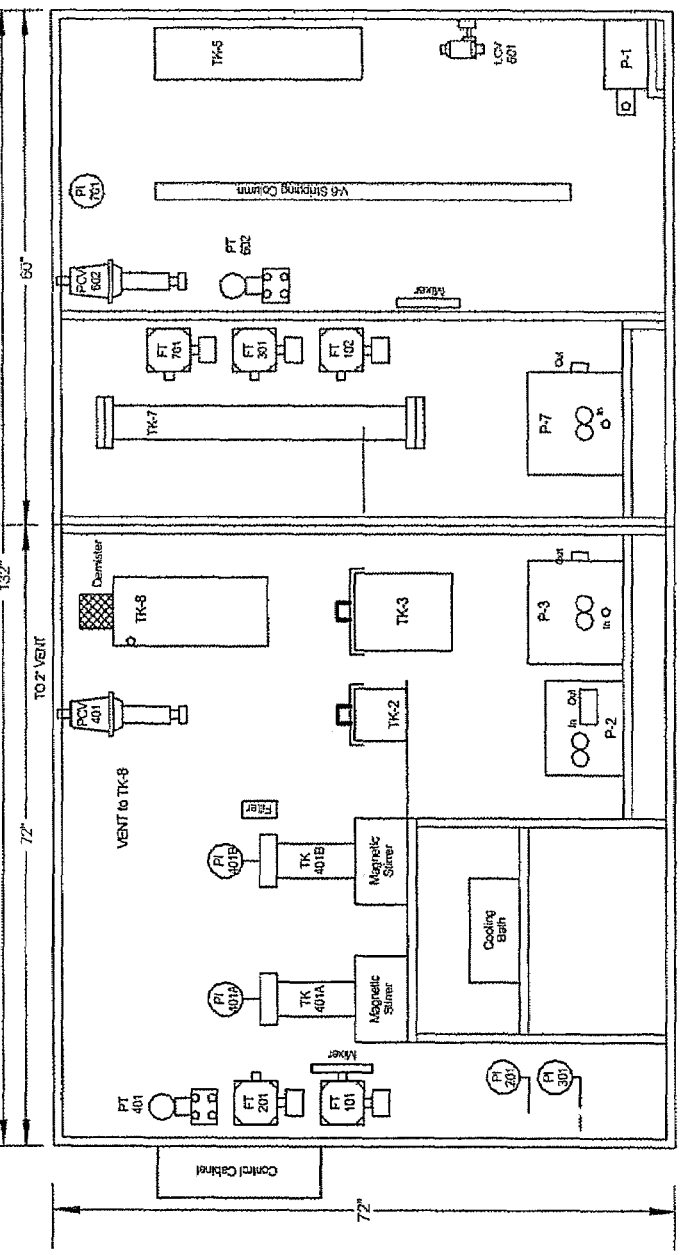
FIG. 7B is a schematic illustration of the embodiment illustrated in FIG. 5, including dimensions.
Figure 8:
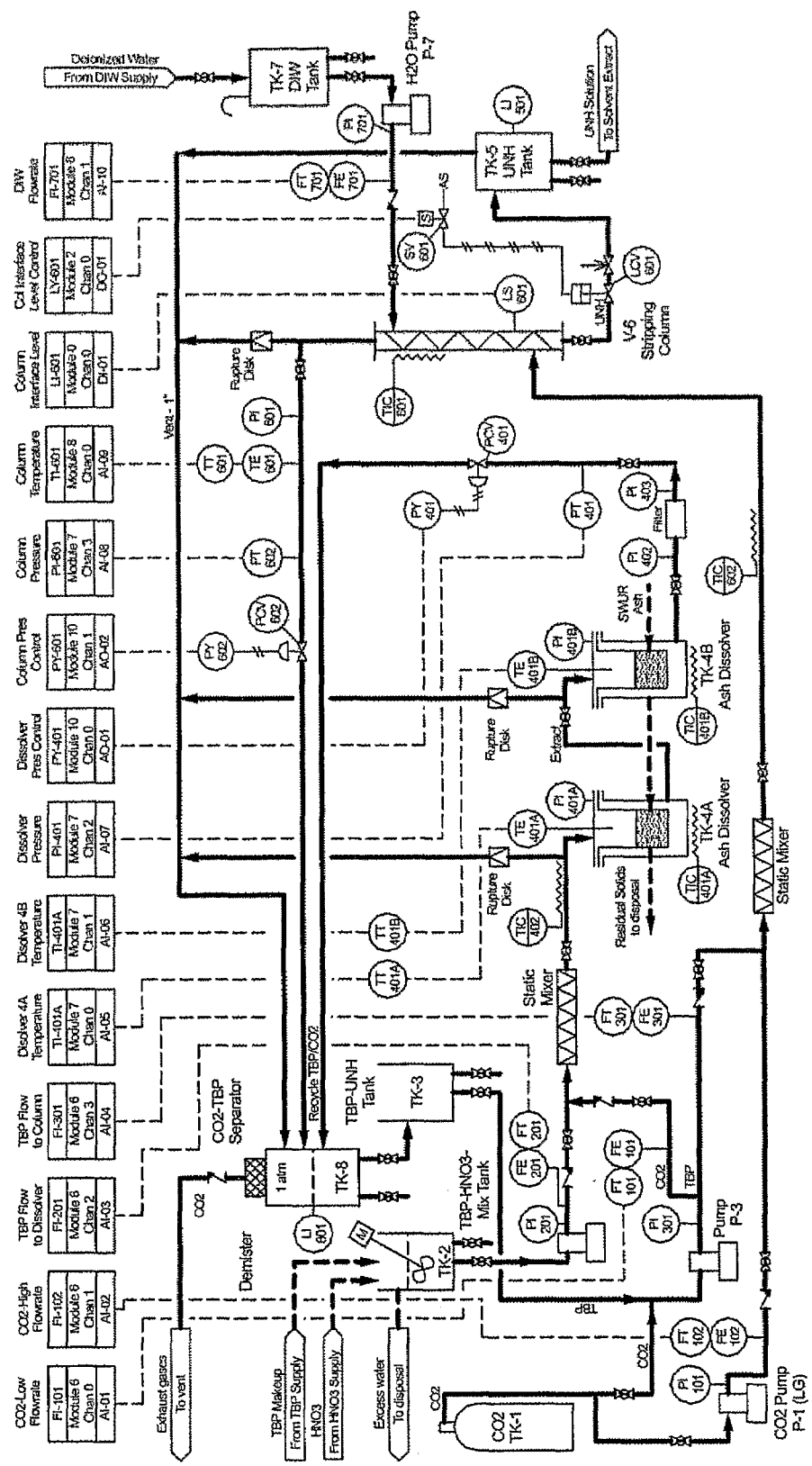
FIG. 8 is a piping and instrumentation diagram of the embodiment illustrated in FIG. 5.

This example describes one embodiment of the disclosed system. FIGS. 5-8 illustrate this embodiment in detail. FIG. 5 is a simplified schematic of the system. FIGS. 6A and 6B are a plan view and a schematic illustration of the system, respectively, with piping detail. FIGS. 7A and 7B are a plan view and a schematic illustration of the system, respectively, with dimension detail. FIG. 8 is a piping and instrumentation diagram for the system. The following abbreviations are used in the labels for certain elements in FIGS. 6-8: level control valve (LCV), pressure control valve (PCV), pump (P), safety valve (SV), and tank (TK). The labels for the remaining elements of the system are coded as shown in Table 8.

TABLE 8

Key to Labels in FIGS. 6-8

First Letter

| | |
|---|---|
| P | pressure |
| L | level |
| T | temperature |
| F | flow |
| H | output |

Second Letter

| | |
|---|---|
| I | indicator |
| T | transmitter |
| E | element |
| S | switch |
| Y | signal converter |

Third Letter

| | |
|---|---|
| C | controller |
| H | high |
| L | low |

A TBP-HNO$_3$-water solution of the form TBP·(HNO$_3$)$_{1.8}$·(H$_2$O)$_{0.6}$ will be made up in TK-2 using recycled TBP and fresh 70% (15.6 M) nitric acid. The excess water from the HNO$_3$ will be skimmed from the makeup tank and recycled or sent to disposal. Alternatively, the TBP solution can be made up in a hood in glassware and poured into TK-2. The TBP-HNO$_3$-water solution will be pumped from TK-2 and mixed with CO$_2$ in a static mixer to form the extractant, which will be fed to the dissolvers. The extractant flow rate will be monitored by flow meter FI-201. The CO$_2$ flow rate to the dissolvers will be measured by flow meter FI-101. The TBP-HNO$_3$ flow rate can be determined by measuring the rate of level drop in TK-2.

Incinerator ash will be placed into inner containers and loaded into the dissolver vessels, TK-4A and 4B. The inner containers will have a sintered metal filter bottom to contain the ash. The TBP-HNO$_3$—CO$_2$ extractant will be fed from the top down through the stationary ash. At the end of the cycle, the flow of extractant will be shut off briefly, allowing the dissolvers to be flushed with pure CO$_2$. After each cycle, TK-4B will receive a fresh batch of ash and TK-4A will receive a batch of ash that has had one extraction performed on it in TK-4B.

As the extractant is fed through the dissolvers to the CO$_2$ separator tank TK-8, the pressure in the dissolvers will be monitored and controlled at 200 bar by pressure transmitter PT-401 and valve PCV-401. The dissolvers will operate at a temperature of approximately 60° C. Temperature will be controlled in the dissolvers by external heaters.

CO$_2$ will be removed from the extractant-uranium mixture and collected in the CO$_2$-TBP separator tank TK-8. At the end of each cycle, the solution will be gravity drained from TK-8 to the TBP-UNH tank TK-3. Approximately five dissolver batches will be collected in TK-3 before running the stripping column. Alternately, for tests on the stripping column, a TBP-HNO$_3$-uranium solution can be made up in TK-3.

Uranium and nitric acid will be removed from the extractant with water in a two-phase countercurrent flow column, V-6. Water will be fed into the column near the top of the column and the TBP-HNO$_3$-uranium mixture will be pumped from TK-3 and mixed with CO$_2$ in a static mixer before entering the bottom of the column. The TBP-HNO$_3$-uranium mixture flow rate will be monitored by flow meter FI-301. The CO$_2$ flow rate will be monitored by flow meter FT-102. The column pressure will be maintained at 200 bar by pressure transmitter PT-602 and valve PCV-601.

Deionized water will be pumped from TK-7 to the top of the column and injected via a nozzle to disperse the water as droplets into the continuous TBP-CO$_2$ phase. The water droplets will extract the uranium and nitric acid and will coalesce and be removed at the bottom of the column as uranyl nitrate solution. An interface between the two phases will be maintained near the bottom of the column by level control switch LS-601 and discharge valve LCV-601. The water flow rate will be monitored by flow meter FI-701. The water flow rate also can be determined by measuring the level decrease rate in TK-7. Column temperature will be controlled by an external heater. The operating temperature is expected to be 50° C. Uranyl nitrate solution will be collected in UNH tank TK-5.

The CO$_2$-TBP mixture exiting the top of the column will be sent to the CO$_2$-TBP separator, TK-8. TK-8 will be sized to collect the entire volume of a stripping column batch. Recovered TBP will be recycled to the ash dissolver tank TK-1 where additional HNO$_3$ will be added to replace the HNO$_3$ consumed in the extraction.

For safety, rupture disks will be provided on the ash dissolvers TK-4A and TK-4B and on the stripping column V-6. A room $CO_2$ monitor will be attached to an audible alarm and a flashing light.

The system shown in FIGS. 5-8 was modeled to study its anticipated performance. For the purpose of this modeling, perfect stripping of U, $HNO_3$, and $H_2O$ from TBP-$CO_2$ and perfect separation of TBP from $CO_2$ was assumed. The basis for the modeling is shown in Table 9.

TABLE 9

Basis for Modeling

| Variable | Basis |
|---|---|
| Extraction Batch Size | 1 kg |
| U Recovery From Ash | 90% |
| $HNO_3$/TBP Ratio | 1.8 |
| $H_2O$/TBP Ratio | 0.6 |
| $CO_2$/TBP Ratio | 10 |
| Fraction TBP Utilized | 0.5 |
| Dissolver Cycle Time | 1 hour |
| Stripper Cycle Time | 1 hour |
| Stripper DIW Flow | 2.5 LPH |

The results of the modeling are shown in Tables 10-13 organized by the stream numbers shown in FIG. 5

TABLE 10

Modeling Data (Streams 1-4)

| Stream | Ash | Residual Solids | Nitric Acid 70% | Reject Water |
|---|---|---|---|---|
| Stream Number | 1 | 2 | 3 | 4 |
| Temperature (*C.) | n/a | n/a | 25 | 25 |
| Pressure (atm) | n/a | n/a | 1 | 1 |
| Density (g/cc) | 1.10 | 1.10 | 1.39 | 1.00 |
| Cycle Time (hour) | 1.0 | 1.0 | 1.0 | 1.0 |
| Batch Volume (L) | 0.91 | 0.83 | 0.054 | 0.014 |
| Flowrate (LPH) | n/a | n/a | n/a | 0.01 |
| Flowrate (cc per minute) | n/a | n/a | n/a | 0.23 |
| U Conc (gU/L) | n/a | n/a | n/a | n/a |
| $HNO_3$ Conc (M) | n/a | n/a | 15.4 | n/a |
| Constituents | | | | |
| $CO_2$ (g/batch) | n/a | n/a | n/a | n/a |
| TBP (g/batch) | n/a | n/a | n/a | n/a |
| $HNO_3$ (g/batch) | n/a | n/a | 52.9 | n/a |
| Water (g/batch) | n/a | n/a | 22.7 | 13.6 |
| Uranium (g/batch) | 100 | 10 | n/a | n/a |
| Inert Solids (g/batch) | 900 | 900 | n/a | n/a |
| Total (g/batch) | 1000 | 910 | 75.6 | 13.6 |

TABLE 11

Modeling Data (Streams 5-8)

| Stream | $HNO_3$-TBP Mix | Liquid $CO_2$ | TBP-$CO_2$ to Dissol | UNH-TBP-$CO_2$ |
|---|---|---|---|---|
| Stream Number | 5 | 6 | 7 | 8 |
| Temperature (*C.) | 25 | 25 | 25 | 60 |
| Pressure (atm) | 1 | 200 | 200 | 200 |
| Density (g/cc) | 1.00 | 0.91 | 0.92 | 0.70 |
| Cycle Time (hour) | 1.0 | 1.0 | 1.0 | 1.0 |
| Batch Volume (L) | 0.465 | 5.11 | 5.6 | 7.43 |
| Flowrate (LPH) | 0.46 | 5.11 | 5.56 | 7.43 |
| Flowrate (cc per minute) | 7.75 | 85.1 | 92.6 | 123.9 |
| U Conc (gU/L) | n/a | n/a | n/a | n/a |
| $HNO_3$ Conc (M) | 1.8 | n/a | n/a | n/a |
| Constituents | | | | |
| $CO_2$ (g/batch) | n/a | 4649 | 4649 | 4649 |
| TBP (g/batch) | 403 | n/a | 402.8 | 403 |
| $HNO_3$ (g/batch) | 52.9 | n/a | 52.9 | 53 |
| Water (g/batch) | 9.1 | n/a | 9.1 | 9 |
| Uranium (g/batch) | n/a | n/a | n/a | 90 |
| Inert Solids (g/batch) | n/a | n/a | n/a | n/a |
| Total (g/batch) | 464.9 | 4649 | 5113 | 5203 |

TABLE 12

Modeling Data (Streams 9-12)

| Stream | TBP-UNH | TBP-UNH to Column | Liquid $CO_2$ | TBP-UNH-$CO_2$ to Col |
|---|---|---|---|---|
| Stream Number | 9 | 10 | 11 | 12 |
| Temperature (*C.) | 60 | 25 | 25 | 25 |
| Pressure (atm) | 1 | 1 | 200 | 200 |
| Density (g/cc) | 1.00 | 1.00 | 0.91 | 0.92 |
| Cycle Time (hour) | 1.0 | 1.0 | 1.0 | 1.0 |
| Batch Volume (L) | 0.55 | 2.77 | 25.5 | 28.3 |
| Flowrate (LPH) | 0.55 | 2.77 | 25.5 | 28.3 |
| Flowrate (cc per minute) | 9.25 | 46.2 | 426 | 471 |
| U Conc (gU/L) | n/a | n/a | n/a | n/a |
| $HNO_3$ Conc (M) | n/a | n/a | n/a | n/a |
| Constituents | | | | |
| $CO_2$ (g/batch) | n/a | n/a | 23243 | 23243 |
| TBP (g/batch) | 402.8 | 2014 | n/a | 2014 |
| $HNO_3$ (g/batch) | 52.9 | 265 | n/a | 265 |
| Water (g/batch) | 9.1 | 45 | n/a | 45.4 |
| Uranium (g/batch) | 90.0 | 450 | n/a | 450.0 |
| Inert Solids (g/batch) | n/a | n/a | n/a | n/a |
| Total (g/batch) | 555 | 2774 | 23243 | 26017 |

TABLE 13

Modeling Data (Streams 13-16)

| Stream | Stripper Water | UNH Product | TBP-$CO_2$ | Recycle TBP |
|---|---|---|---|---|
| Stream Number | 13 | 14 | 15 | 16 |
| Temperature (*C.) | 25 | 25 | 50 | 25 |
| Pressure (atm) | 1 | 1 | 55 | 1 |
| Density (g/cc) | 1.00 | 1.30 | 0.90 | 1.00 |
| Cycle Time (hour) | 1.0 | 1.0 | 1.0 | 1.0 |
| Batch Volume (L) | 2.50 | 2.51 | 28.1 | 2.01 |
| Flowrate (LPH) | 2.50 | 2.51 | 28.1 | 2.01 |
| Flowrate (cc per minute) | 41.7 | 41.8 | 468 | 33.6 |
| U Conc (gU/L) | n/a | 179 | n/a | n/a |
| $HNO_3$ Conc (M) | n/a | 1.68 | n/a | n/a |

TABLE 13-continued

Modeling Data (Streams 13-16)

| | Stripper Water | UNH Product | TBP-$CO_2$ | Recycle TBP |
|---|---|---|---|---|
| Constituents | | | | |
| $CO_2$ (g/batch) | n/a | n/a | 23243 | n/a |
| TBP (g/batch) | n/a | n/a | 2014 | 2014 |
| $HNO_3$ (g/batch) | n/a | 265 | n/a | n/a |
| Water (g/batch) | 2500 | 2545 | n/a | n/a |
| Uranium (g/batch) | n/a | 450 | n/a | n/a |
| Inert Solids (g/batch) | n/a | n/a | n/a | n/a |
| Total (g/batch) | 2500 | 3260 | 25257 | 2014 |

Example 3

This example provides a comparison of uranium recovery by one embodiment of the disclosed process and uranium recovery by the PUREX process. Table 14 shows the initial concentration of nitric acid in the aqueous phase, the final concentration of uranium in the aqueous phase and the distribution ratio achieved in four trials modeling one embodiment of the disclosed process. The distribution ratios are equal to the concentration of uranium in the organic phase by weight divided by the concentration of uranium in the aqueous phase by weight. For the trials shown in Table 14, the uranium was extracted in supercritical carbon dioxide at 200 bar and 50° C. The ratio of TBP to water in the stripping step was 1.0.

TABLE 14

Uranium Recovery with TBP in Supercritical $CO_2$

| Trial | Initial Concentration of $HNO_3$ in the Aqueous Phase (M) | Final Concentration of Uranium in the Aqueous Phase (M) | Distribution Ratio |
|---|---|---|---|
| Trial 1 | 1.2 | 0.42 | 1 |
| Trial 2 | 4.8 | 0.11 | 5.9 |
| Trial 3 | 6.7 | 0.066 | 9.2 |
| Trial 4 | 1.9 | 0.15 | 2.2 |

Table 15 shows the initial concentration of nitric acid in the aqueous phase, the final concentration of uranium in the aqueous phase and the distribution ratio achieved in four trials modeling the PUREX process. This data was collected from a 1968 Department of Energy report.

TABLE 15

Uranium Recovery with 30% TBP in Dodecane

| Trial | Initial Concentration of $HNO_3$ in the Aqueous Phase (M) | Final Concentration of Uranium in the Aqueous Phase (M) | Distribution Ratio |
|---|---|---|---|
| Trial 1 | 1 | 0.4 | 1.3 |
| Trial 2 | 5 | 0.1 | 4.5 |
| Trial 3 | >5.0 | No data | No data |
| Trial 4 | 2 | 0.15 | 2.6 |

By comparing the data in Table 14 with the data in Table 15, it is clear that the tested embodiment of the disclosed process is generally similar in performance to the PUREX process. The similarities suggest that the nitric acid concentrations used in the PUREX process to separate uranium from other metals also may work with the disclosed process for the same purpose. In the PUREX process, with a 2 to 3 molar free $HNO_3$ concentration in the aqueous phase, most of the uranium enters the organic phase while nearly all of the gadolinium remains in the aqueous phase. It follows, therefore, that, in the stripping step of the disclosed process, gadolinium will enter the aqueous phase and leave the uranium behind in the organic phase when the nitric acid concentration in the aqueous phase is 2 to 3 molar.

Example 4

Figure 9:
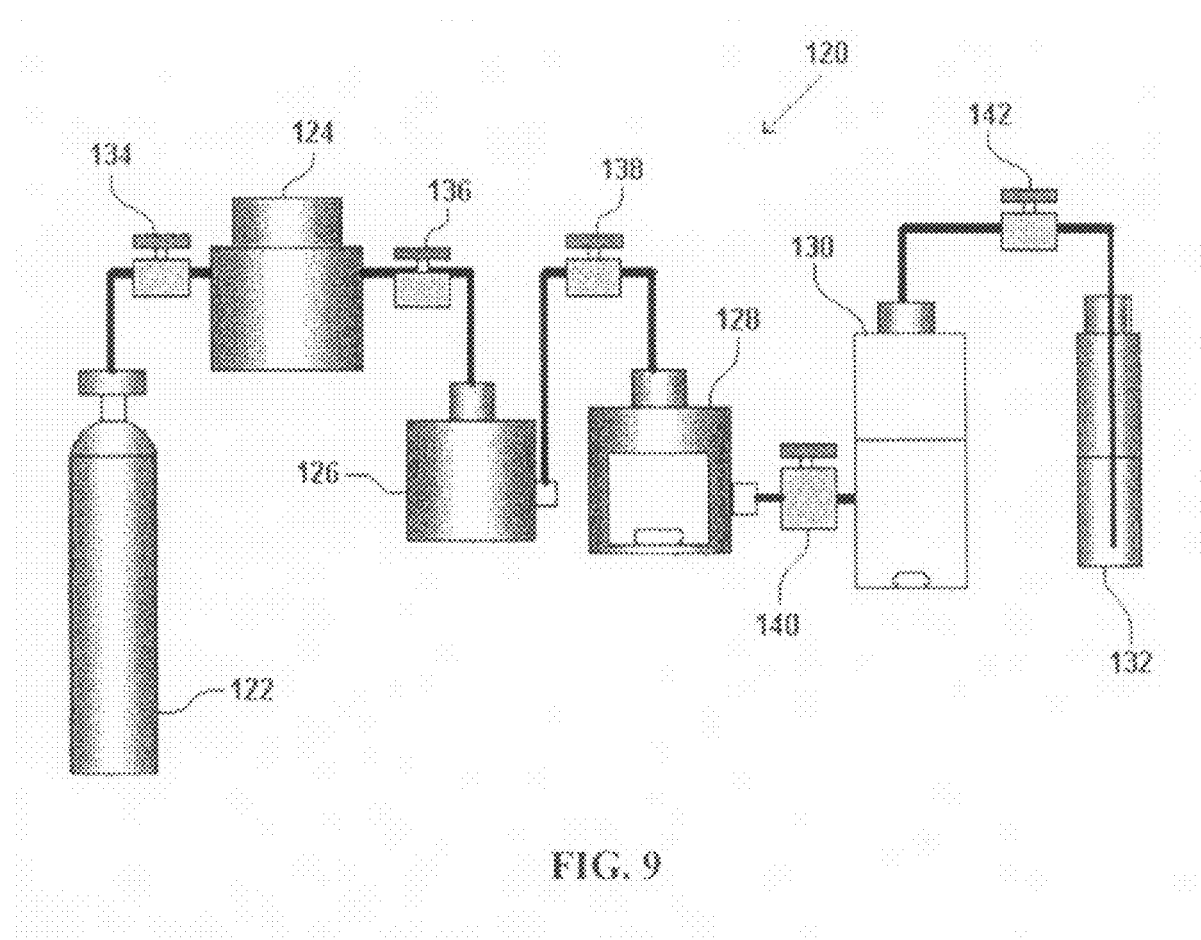
FIG. 9 is a schematic illustration of an experimental apparatus for stripping gadolinium from a supercritical carbon dioxide phase.

This example describes a laboratory trial that was performed to test gadolinium stripping from a supercritical carbon dioxide phase. The apparatus used for this experiment is illustrated in FIG. 9. The apparatus 120 comprises a carbon dioxide supply 122, a pump 124, a first cell 126, a second cell 128, a third cell 130 and a collection vial 132. The flow between these elements is controlled by a first valve 134, a second valve 136, a third valve 138, a fourth valve 140 and a fifth valve 142.

About 1.5 mL of TBP$(HNO_3)_{1.8}(H_2O)_{0.6}$ was placed in the first cell 126 and a solid sample of $Gd_2O_3$ (100 mg) was placed in the second cell 128. Supercritical carbon dioxide at 40° C. and 150 atm was passed into the first cell 126 and then into second cell 128 to dissolve the $Gd_2O_3$. The resulting supercritical fluid solution containing dissolved gadolinium was then fed into the third cell 130, which contained 20 mL of a 2.2 M nitric acid solution. The supercritical fluid phase and the aqueous nitric acid phase were stirred with a magnetic bar for 60 minutes with the fourth valve 140 and the fifth valve 142 closed. After this, the fifth valve 142 was opened to release the supercritical fluid phase into the collection vial 132 along with 20 mL of water under ambient pressure. The remaining nitric acid solution was removed from the third cell 130 after the trial.

The concentrations of gadolinium in the nitric acid solution and in the water of the collection vial were measured by ICP-MS. The ratio of gadolinium in the nitric acid solution to gadolinium in the water of the collection vial was assumed to be the distribution ratio of Gd between the nitric acid phase and the supercritical carbon dioxide phase at 40° C. and 150 atm. The experimental ratio of the concentration of gadolinium in the nitric acid phase to the concentration of gadolinium in the supercritical carbon dioxide phase was about 50. This result further establishes that gadolinium can be separated from uranium in a supercritical carbon dioxide solution using the disclosed counter-current column stripping method.

OTHER EMBODIMENTS

Having illustrated and described the principles of the invention in exemplary embodiments, it should be apparent to those skilled in the art that the illustrative embodiments can be modified in arrangement and detail without departing from such principles. In view of the many possible embodiments to which the principles of the invention can be applied, it should be understood that the illustrative embodiments are intended to teach these principles and are not intended to be a limitation on the scope of the invention. We therefore claim as our invention all that comes within the scope and spirit of the following claims and their equivalents.

We claim:

1. A method, comprising:
exposing a metal-containing material to an extractant comprising a liquid or supercritical-fluid solvent and an acid-base complex comprising an oxidizing agent and a complexing agent, thereby forming an extract, the extract comprising at least a portion of the liquid or supercritical-fluid solvent and a metal-containing complex comprising at least a portion of the complexing agent and at least a portion of a metal from the metal-containing material; and exposing at least a portion of the extract to a stripping agent in a stripping process to form a strip product and a raffinate, where the strip product comprises at least a portion of the metal and at least a portion of the stripping agent, and the raffinate comprises at least a portion of the liquid or supercritical-fluid solvent and at least a portion of the complexing agent, where exposing the extract to the stripping agent comprises introducing at least a portion of the extract into a first end of a countercurrent stripping column, introducing at least a portion of the stripping agent into a second end of the countercurrent stripping column, collecting at least a portion of the stripping agent near the first end of the stripping column as the strip product, and collecting at least a portion of the extract near the second end of the stripping column as the raffinate.

2. The method of claim 1 comprising introducing at least a portion of the stripping agent as droplets.

3. The method of claim 1 comprising spraying at least a portion of the stripping agent into the second end of the stripping column.

4. The method of claim 1 where the metal-containing material comprises the metal and an extraneous material, and exposing the metal-containing material to the extractant comprises exposing the metal-containing material to the extractant in a countercurrent extraction process to form the extract and a residue comprising at least a portion of the extraneous material.

5. The method of claim 1 where the method is a substantially continuous process.

6. The method of claim 1 where the metal is uranium.

7. The method of claim 1 where the metal is plutonium.

8. The method of claim 1 where exposing the metal-containing material to the extractant comprises exposing the metal-containing material to a supercritical-fluid solvent.

9. The method of claim 1 where the metal-containing material is incinerator ash.

10. The method of claim 1 where the liquid or supercritical-fluid solvent is carbon dioxide.

11. The method of claim 1 where the stripping agent is water.

12. The method of claim 1 where the oxidizing agent is a mineral acid.

13. The method according to claim 12 where the oxidizing agent is nitric acid.

14. The method of claim 1 where the complexing agent is a trialkyl phosphate, a trialkylphosphine oxide, or combinations thereof.

15. The method according to claim 14 where the complexing agent is tributylphosphate.

16. The method of claim 1 where the stripping process is a countercurrent stripping process.

17. The method of claim 1 where exposing the extract to the stripping agent comprises spraying at least a portion of the stripping agent into the extract.

18. The method of claim 1 where exposing the metal-containing material to the extractant comprises exposing the metal-containing material to the extractant in a multi-stage, semi-batch process.

19. A method, comprising:
exposing a metal-containing material comprising a metal and an extraneous material to an extractant in a countercurrent process, the extractant comprising a liquid or supercritical-fluid solvent and an acid-base complex comprising an oxidizing agent and a complexing agent, thereby forming an extract, the extract comprising at least a portion of the liquid or supercritical-fluid solvent and a metal-containing complex comprising at least a portion of the complexing agent and at least a portion of a metal from the metal-containing material; and exposing at least a portion of the extract to a stripping agent in a stripping process to form a strip product and a raffinate, where the strip product comprises at least a portion of the metal and at least a portion of the stripping agent, and the raffinate comprises at least a portion of the liquid or supercritical-fluid solvent and at least a portion of the complexing agent;

wherein exposing the metal-containing material to the extractant comprises moving batches of the metal-containing material between two or more stations in a first order and moving at least a portion of the extractant between the two or more stations in a second order opposite to the first order, such that the metal-containing material is in contact with extractant having a lower concentration of the metal as the concentration of the metal in the metal-containing material decreases.

20. The method of claim 19 where the stripping process is a countercurrent stripping process.

21. The method of claim 19 where the method is a substantially continuous process.

22. The method of claim 19 where the metal is uranium.

23. The method of claim 19 where the metal is plutonium.

24. The method of claim 19 where exposing the metal-containing material to the extractant comprises exposing the metal-containing material to a supercritical-fluid solvent.

25. The method of claim 19 where the metal-containing material is incinerator ash.

26. The method of claim 19 where the liquid or supercritical-fluid solvent is carbon dioxide.

27. The method of claim 19 where the stripping agent is water.

28. The method of claim 19 where the oxidizing agent is a mineral acid.

29. The method according to claim 19 where the oxidizing agent is nitric acid.

30. The method of claim 19 where the complexing agent is a trialkyl phosphate, a trialkylphosphine oxide, or combinations thereof.

31. The method of claim 30 where the complexing agent is tributylphosphate.

32. The method of claim 19 where the stripping process is a countercurrent stripping process.

33. The method of claim 19 where exposing the extract to the stripping agent comprises spraying at least a portion of the stripping agent into the extract.

34. The method of claim 19 where exposing the metal-containing material to the extractant comprises exposing the metal-containing material to the extractant in a multi-stage, semi-batch process.

35. A method, comprising:
exposing a metal-containing material to an extractant comprising a liquid or supercritical-fluid solvent and an acid-base complex comprising an oxidizing agent and a complexing agent, thereby forming an extract, the extract comprising at least a portion of the liquid or supercritical-fluid solvent and a metal-containing complex comprising at least a portion of the complexing agent and at least a portion of a metal from the metal-containing material;

exposing at least a portion of the extract to a stripping agent in a stripping process to form a strip product and a raffinate, where the strip product comprises at least a portion of the metal and at least a portion of the stripping agent, and the raffinate comprises at least a portion of the liquid or supercritical-fluid solvent and at least a portion of the complexing agent; and separating at least a portion of the liquid or supercritical-fluid solvent from at least a portion of the complexing agent by decreasing the pressure and/or increasing the temperature of at least a portion of the raffinate, where after the separation, at least a portion of the liquid or supercritical-fluid solvent from the raffinate becomes a recovered gas and at least a portion of the complexing agent from the raffinate becomes a recovered complexing agent.

36. The method of claim 35 further comprising mixing at least a portion of the recovered complexing agent with at least a portion of the oxidizing agent to form a recovered acid-base complex.

37. The method of claim 36 further comprising mixing at least a portion of the recovered acid-base complex with at least a portion of the liquid or supercritical-fluid solvent using a static mixer to form a recovered extractant.

38. The method of claim 37 where exposing the metal-containing material to the extractant comprises exposing the metal-containing material to at least a portion of the recovered extractant.

39. The method of claim 35 further comprising condensing at least a portion of the recovered gas to form a recovered liquid or supercritical-fluid solvent.

40. The method of claim 39 further comprising mixing at least a portion of the recovered complexing agent with at least a portion of the oxidizing agent to form a recovered acid-base complex, and mixing at least a portion of the recovered acid-base complex with at least a portion of the recovered liquid or supercritical-fluid solvent using a static mixer to form a recovered extractant.

41. The method of claim 40 where exposing the metal-containing material to an extractant comprises exposing the metal-containing material to at least a portion of the recovered extractant.

42. The method of claim 1, where the method is a substantially continuous process in which the solvent is substantially continuously maintained in liquid or supercritical fluid form.

43. The method of claim 1 comprising recharging the raffinate with the oxidizing agent to form a recovered extractant.

44. The method of claim 43 further comprising introducing make-up liquid or supercritical-fluid solvent, make-up complexing agent, or both, into the recovered extractant.

45. The method of claim 43 where exposing the metal-containing material to an extractant comprises exposing the metal-containing material to at least a portion of the recovered extractant.

46. The method of claim 35 where the method is a substantially continuous process.

47. The method of claim 35 where the metal is uranium.

48. The method of claim 35 where the metal is plutonium.

49. The method of claim 35 where exposing the metal-containing material to the extractant comprises exposing the metal-containing material to a supercritical-fluid solvent.

50. The method of claim 35 where the metal-containing material is incinerator ash.

51. The method of claim 35 where the liquid or supercritical-fluid solvent is carbon dioxide.

52. The method of claim 35 where the stripping agent is water.

53. The method of claim 35 where the oxidizing agent is a mineral acid.

54. The method of claim 53 where the oxidizing agent is nitric acid.

55. The method of claim 35 where the complexing agent is a trialkyl phosphate, a trialkylphosphine oxide, or combinations thereof.

56. The method of claim 55 where the complexing agent is tributylphosphate.

57. The method of claim 35 where the stripping process is a countercurrent stripping process.

58. The method of claim 35 where exposing the extract to the stripping agent comprises spraying at least a portion of the stripping agent into the extract.

59. The method of claim 35 where exposing the metal-containing material to the extractant comprises exposing the metal-containing material to the extractant in a multi-stage, semi-batch process.

60. A method, comprising:
exposing a metal-containing material to an extractant comprising a liquid or supercritical-fluid solvent and an acid-base complex comprising an oxidizing agent and a complexing agent, thereby forming an extract, the extract comprising at least a portion of the liquid or supercritical-fluid solvent and a metal-containing complex comprising at least a portion of the complexing agent and at least a portion of a metal from the metal-containing material;

exposing at least a portion of the extract to a stripping agent in a stripping process to form a strip product and a raffinate, where the strip product comprises at least a portion of the metal and at least a portion of the stripping agent, and the raffinate comprises at least a portion of the liquid or supercritical-fluid solvent and at least a portion of the complexing agent; and recharging the raffinate with the oxidizing agent to form a recovered extractant, where recharging the raffinate comprises introducing at least a portion of the raffinate into a first end of a countercurrent recharging column, introducing at least a portion of the oxidizing agent into a second end of the countercurrent recharging column, collecting at least a portion of the oxidizing agent near the first end of the recharging column as an excess oxidizing agent, and collecting at least a portion of the raffinate near the second end of the recharging column as the recovered extractant.

61. The method of claim 60 where exposing at least a portion of the extract to a stripping agent comprises exposing at least a portion of the extract to at least a portion of the excess oxidizing agent.

62. The method of claim 60 where the method is a substantially continuous process.

63. The method of claim 60 where the metal is uranium.

64. The method of claim 60 where the metal is plutonium.

65. The method of claim 60 where exposing the metal-containing material to the extractant comprises exposing the metal-containing material to a supercritical-fluid solvent.

66. The method of claim 60 where the metal-containing material is incinerator ash.

67. The method of claim 60 where the liquid or supercritical-fluid solvent is carbon dioxide.

68. The method of claim 60 where the stripping agent is water.

69. The method of claim 60 where the oxidizing agent is a mineral acid.

70. The method of claim 69 where the oxidizing agent is nitric acid.

71. The method of claim 60 where the complexing agent is a trialkyl phosphate, a trialkylphosphine oxide, or combinations thereof.

72. The method of claim 71 where the complexing agent is tributylphosphate.

73. The method of claim 60 where the stripping process is a countercurrent stripping process.

74. The method of claim 60 where exposing the extract to the stripping agent comprises spraying at least a portion of the stripping agent into the extract.

75. The method of claim 60 where exposing the metal-containing material to the extractant comprises exposing the metal-containing material to the extractant in a multi-stage, semi-batch process.

* * * * *